(12) United States Patent
Meskers

(10) Patent No.: US 12,215,004 B2
(45) Date of Patent: Feb. 4, 2025

(54) ASSEMBLY AND METHOD FOR INSTALLING A PILE INTO A SEABED

(71) Applicant: Heerema Marine Contractors Nederland SE, Leiden (NL)

(72) Inventor: Gerardus Petrus Meskers, Leiden (NL)

(73) Assignee: Heerema Marine Contractors Nederland SE, Leiden (NL)

( * ) Notice: Subject to any disclaimer, the term of this patent is extended or adjusted under 35 U.S.C. 154(b) by 124 days.

(21) Appl. No.: 17/793,577

(22) PCT Filed: Jan. 20, 2021

(86) PCT No.: PCT/EP2021/051219
§ 371 (c)(1),
(2) Date: Jul. 18, 2022

(87) PCT Pub. No.: WO2021/148479
PCT Pub. Date: Jul. 29, 2021

(65) Prior Publication Data
US 2023/0046101 A1    Feb. 16, 2023

Related U.S. Application Data

(60) Provisional application No. 62/963,878, filed on Jan. 21, 2020.

(30) Foreign Application Priority Data

Mar. 19, 2020    (NL) ..................................... 2025169

(51) Int. Cl.
*E02D 7/00*    (2006.01)
*B66C 23/52*    (2006.01)
(Continued)

(52) U.S. Cl.
CPC ................ *B66C 23/52* (2013.01); *E02D 7/00* (2013.01); *E02D 7/06* (2013.01); *E02D 13/04* (2013.01);
(Continued)

(58) Field of Classification Search
CPC ......... E02D 7/00; E02D 13/04; E02D 27/425; E02B 2017/0039
See application file for complete search history.

(56) References Cited

U.S. PATENT DOCUMENTS 5,090,485 A * 2/1992 Pomonik .................. E02D 7/18
173/1
7,770,655 B2    8/2010 Wilde et al.
(Continued)

FOREIGN PATENT DOCUMENTS

CN          1165661 C      9/2004
CN          107237722 B    8/2019
(Continued)

OTHER PUBLICATIONS

International Search Report and Written Opinion dated Jul. 30, 2021 for Application No. PCT/EP2021/051219.
(Continued)

*Primary Examiner* — Sean D Andrish
(74) *Attorney, Agent, or Firm* — Patterson + Sheridan, LLP

(57) ABSTRACT

The present invention relates to an assembly for installing a pile in a seabed, the assembly comprising a vessel comprising a positioning system for keeping the vessel at an installation location relative to the seabed, the positioning system having a positioning stiffness; a pile guiding system configured to guide the pile during installation thereof, the pile guiding system comprising a base provided on the vessel; a first guiding device connected to the base, the first
(Continued)

guiding device being configured to accommodate the pile during installation thereof; a resilient member for providing a resilient connection between the vessel and the pile during installation thereof for allowing relative motions between the pile and the vessel, the resilient member having a connection stiffness, wherein the resilient member is configured and intended to keep a natural period of a pivoting movement of the pile about the seabed caused by waves during installation thereof longer than a dominant wave period of a wave spectrum at the installation location by providing the resilient connection with a low connection stiffness.

19 Claims, 28 Drawing Sheets

(51) Int. Cl.
    *E02D 7/06*     (2006.01)
    *E02D 13/04*     (2006.01)
    *E02D 27/52*     (2006.01)
    *E02B 17/00*     (2006.01)

(52) U.S. Cl.
    CPC .... *E02D 27/525* (2013.01); *E02B 2017/0039* (2013.01)

(56) References Cited

U.S. PATENT DOCUMENTS

| | | |
|---|---|---|
| 2007/0017680 A1 | 1/2007 | Wilde et al. |
| 2019/0264416 A1 | 8/2019 | Oltmann |
| 2021/0123203 A1* | 4/2021 | Rabaut ................. B63B 35/003 |

FOREIGN PATENT DOCUMENTS

| | | |
|---|---|---|
| DE | 202009006507 U1 | 8/2009 |
| EP | 3255210 A2 | 12/2017 |
| EP | 3517479 A1 | 7/2019 |
| GB | 2075096 A | 11/1981 |
| TW | 201902782 A | 1/2019 |
| WO | 2016048156 A1 | 3/2016 |
| WO | 2016048516 A1 | 3/2016 |
| WO | 2018117846 A1 | 6/2018 |
| WO | 2019125172 A2 | 6/2019 |
| WO | 2019149674 A1 | 8/2019 |
| WO | 2019172752 A2 | 9/2019 |

OTHER PUBLICATIONS

Search Report and Written Opinion dated Jan. 22, 2021 for Application No. NL2025169.
EPO Office Action dated Aug. 1, 2023, for European Application No. 21700950.5.

* cited by examiner

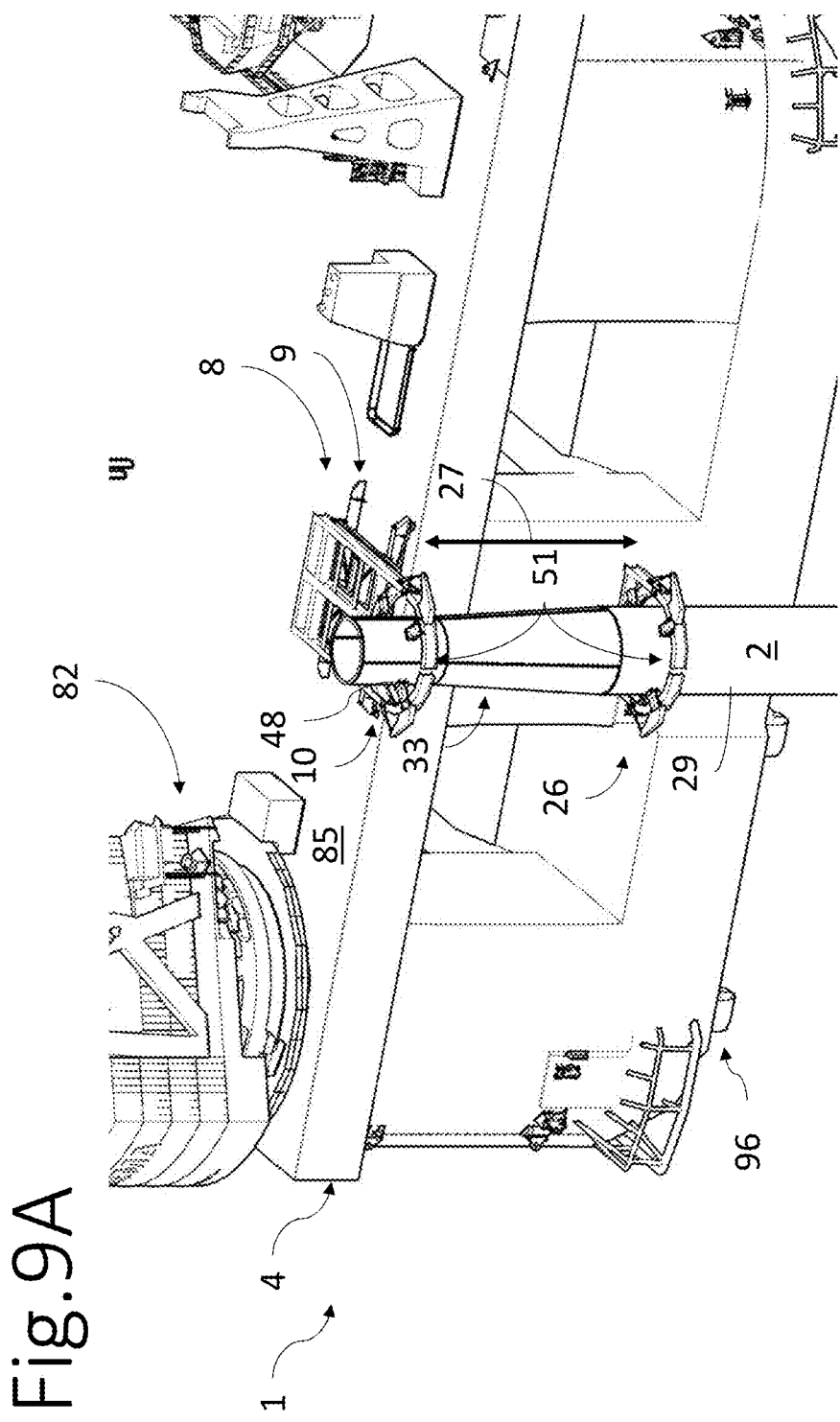

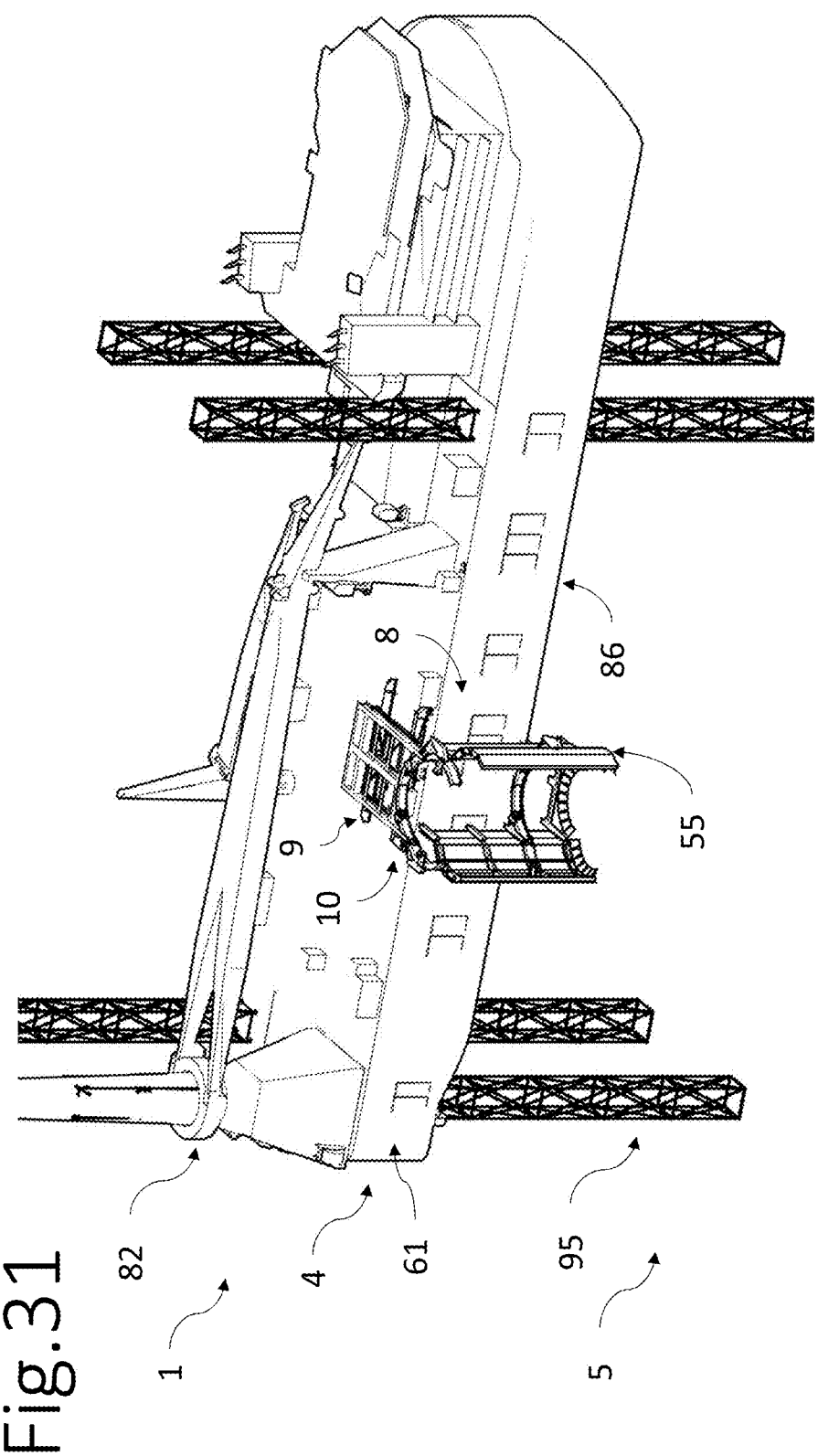

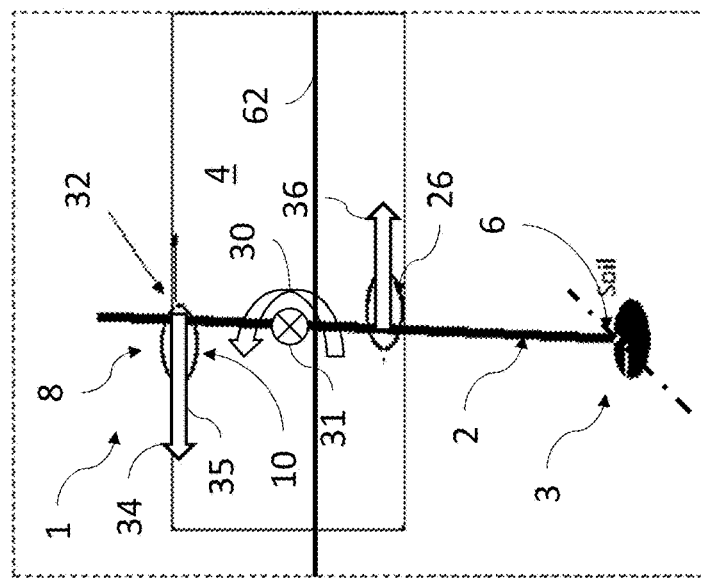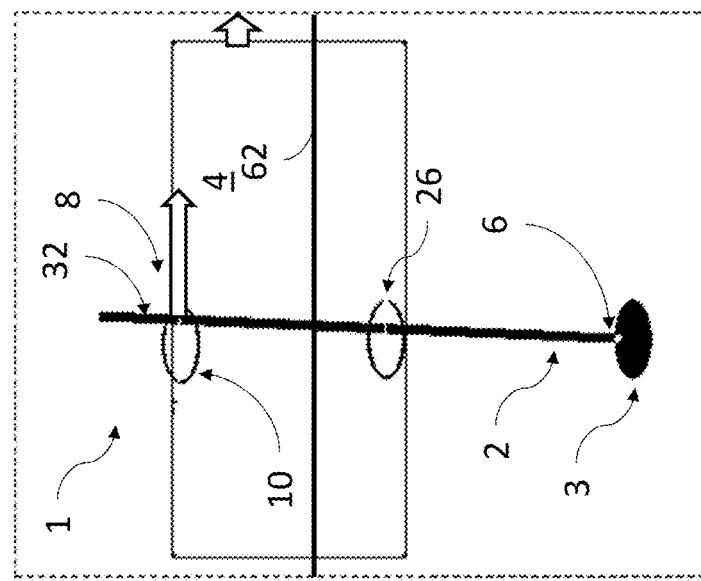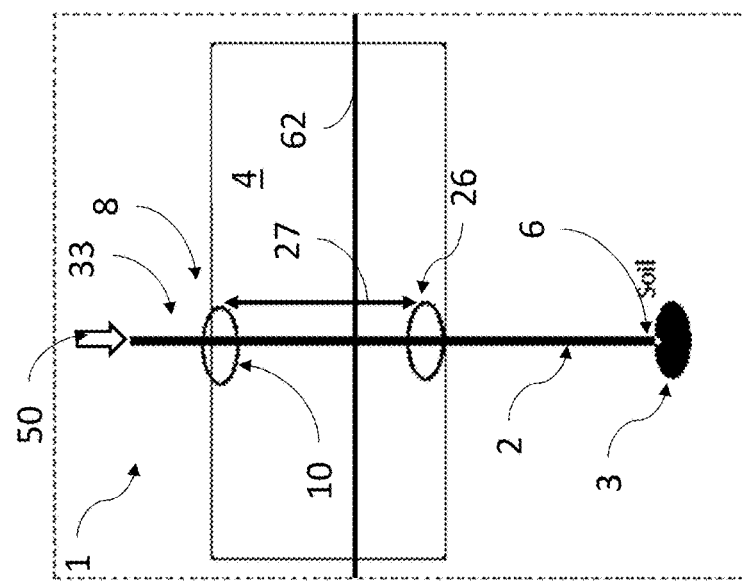

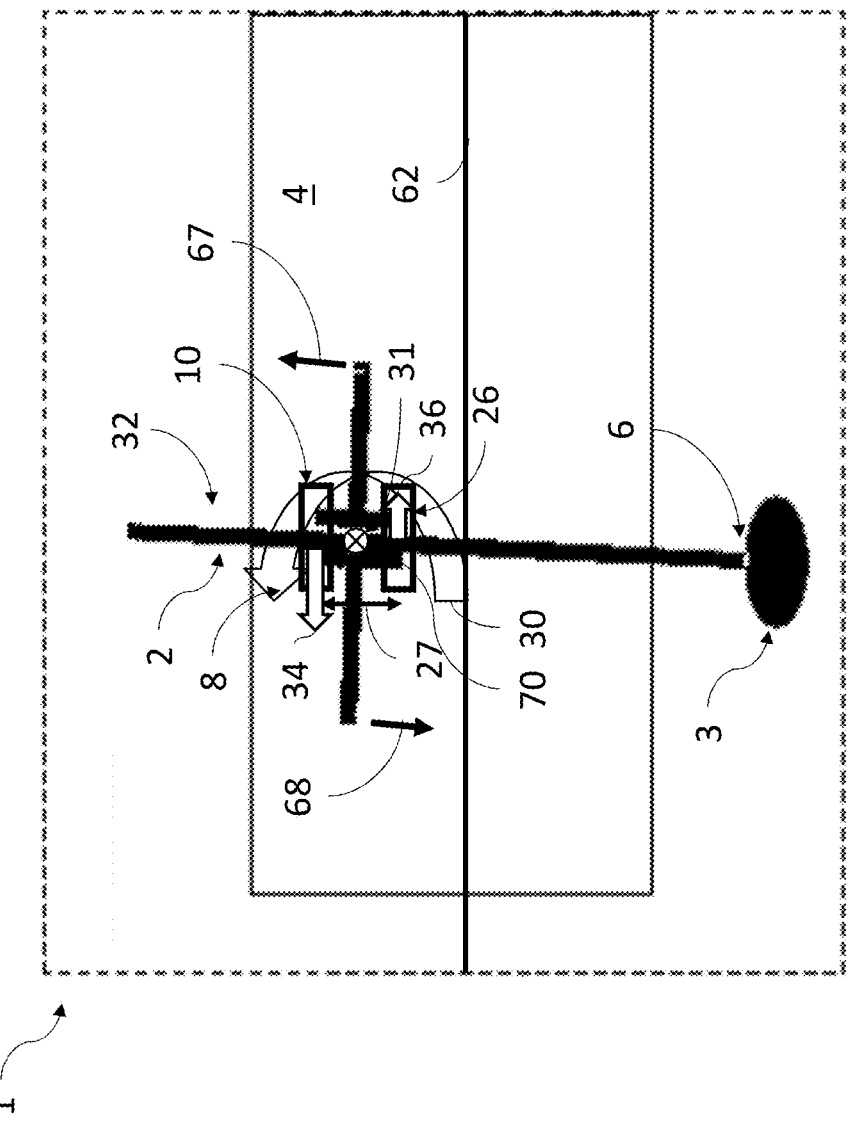

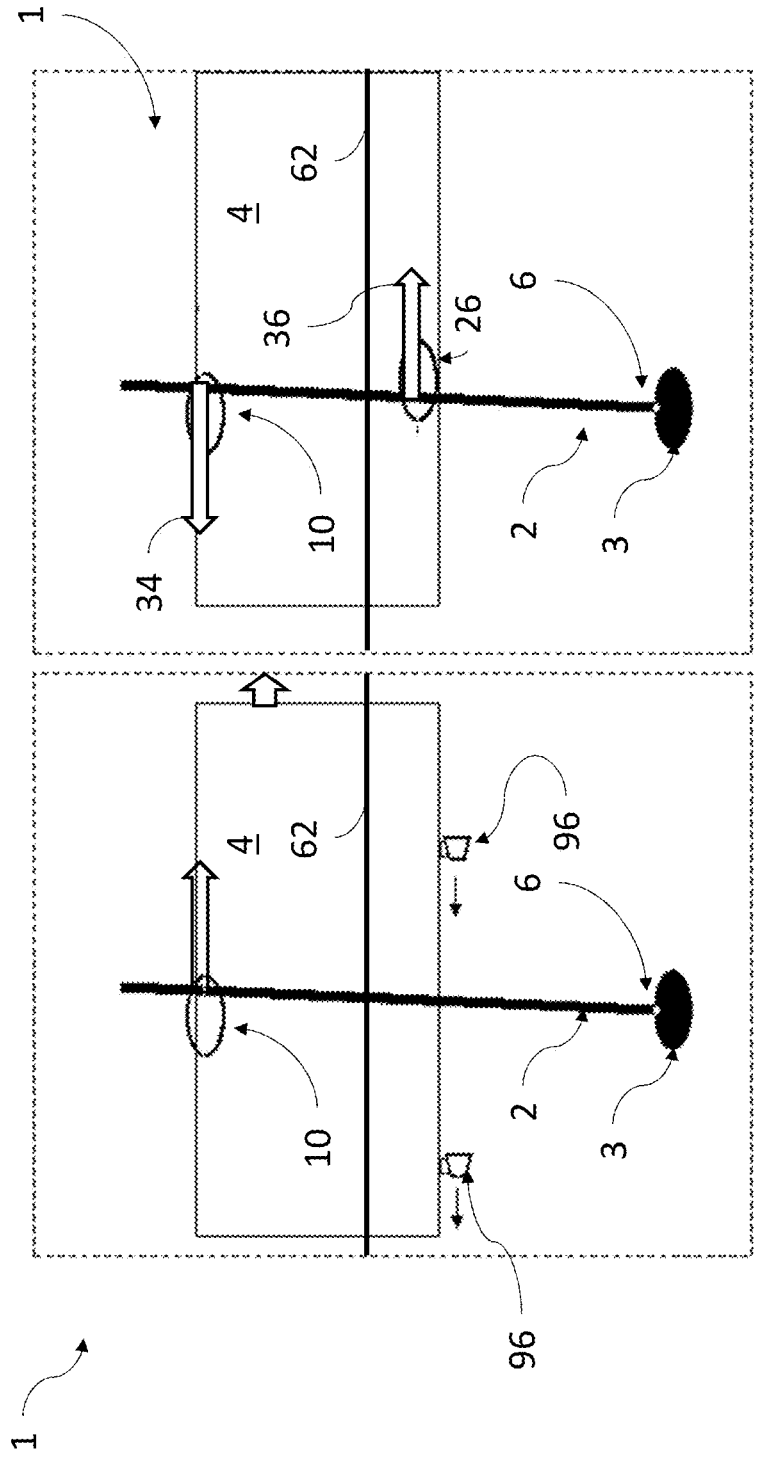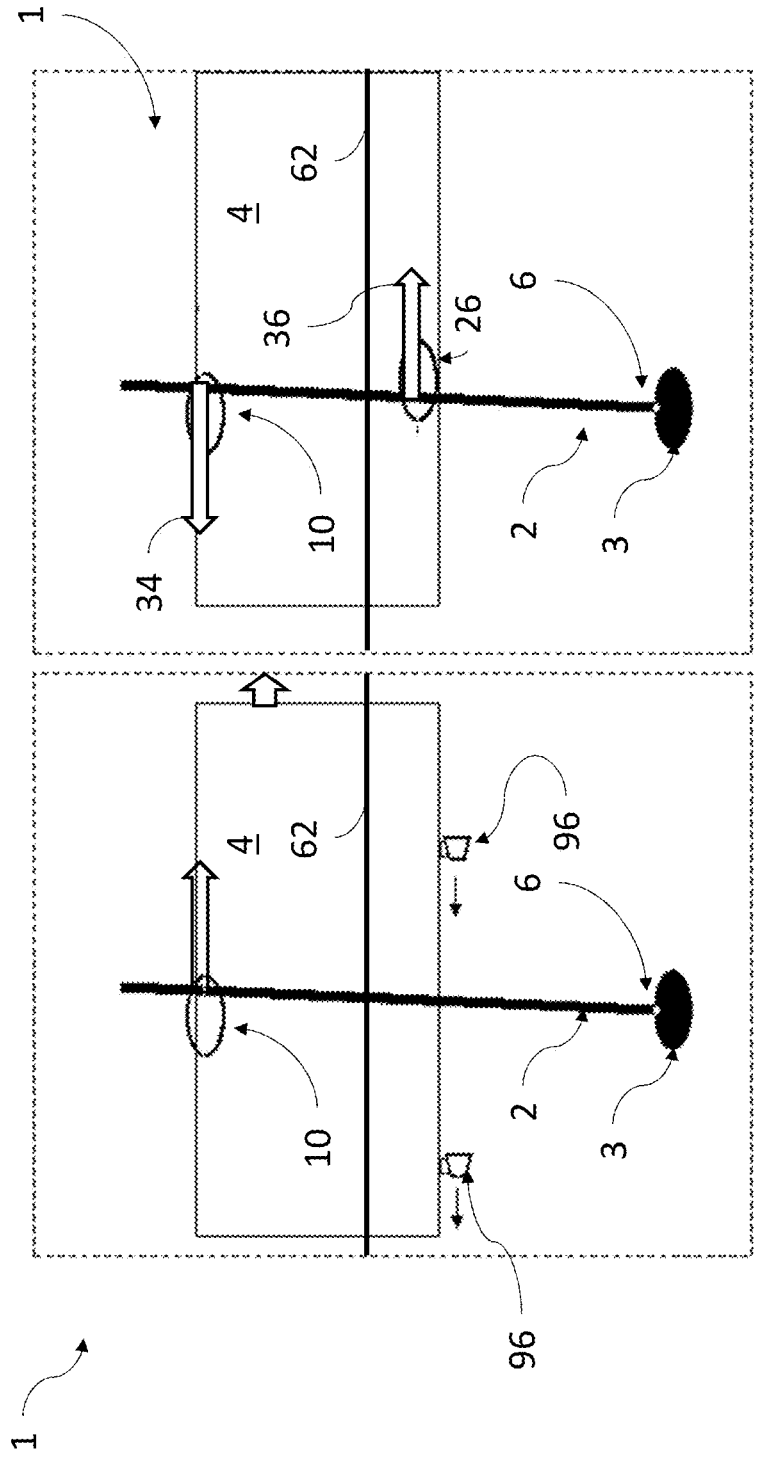

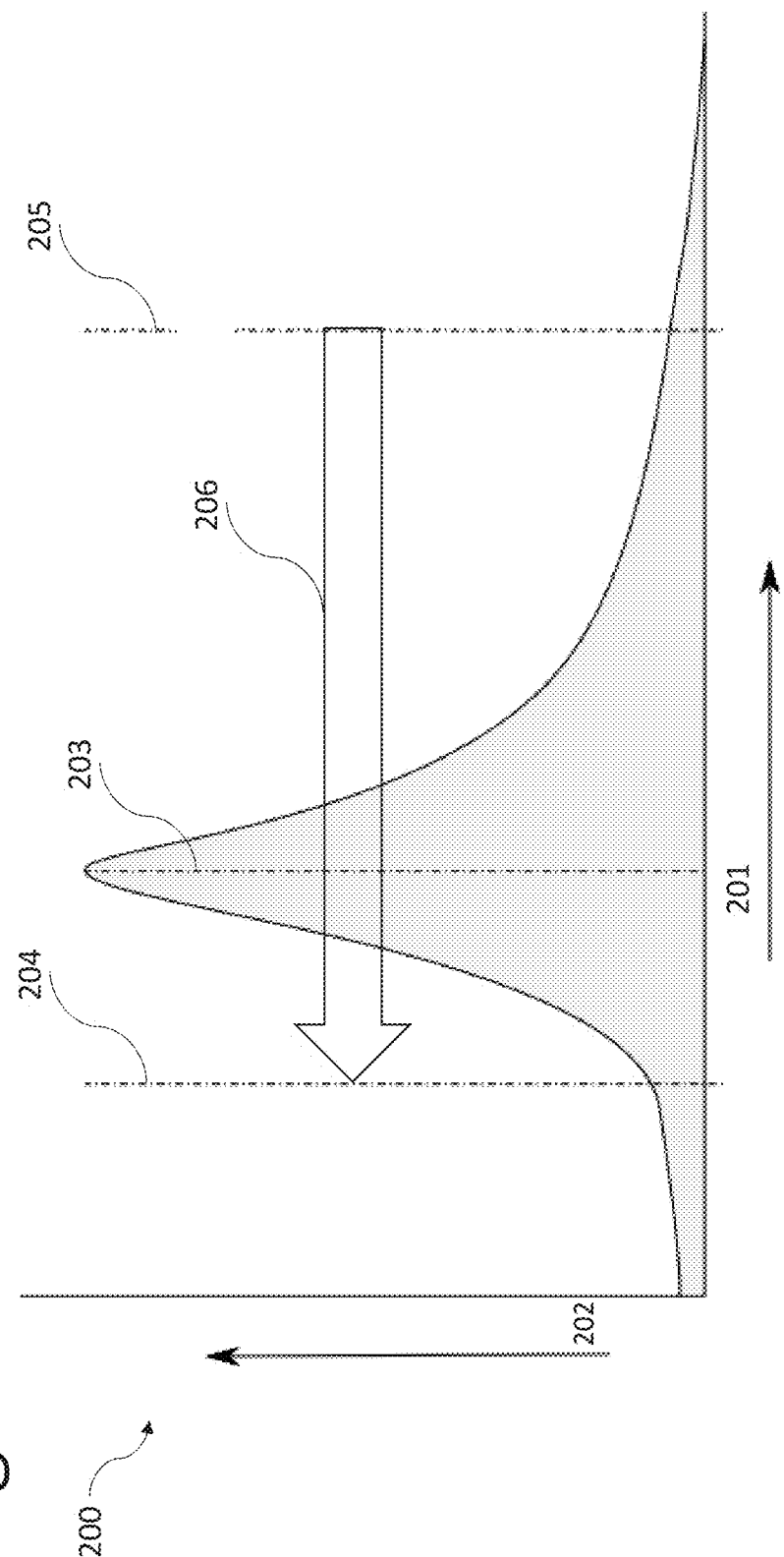

ASSEMBLY AND METHOD FOR INSTALLING A PILE INTO A SEABED

FIELD OF THE INVENTION

The invention relates to the field of pile installation in a seabed, in particular to an assembly and method for installing a pile in a seabed.

The invention further relates to a pile guiding system configured to be connected to a vessel.

The invention yet further relates to a pile guiding system configured to be connected to a floating vessel and configured to assist in keeping the floating vessel at an installation location during installation of a pile into a seabed at the installation location and a corresponding method.

BACKGROUND OF THE INVENTION

Installation of piles into a seabed is often required when installing wind turbines. The foundation of wind turbines usually comprises a monopile which is driven into the seabed at an installation location.

The installation of the piles into the seabed is complex since the piles tend to fall over during installation and narrow installation tolerances are set on verticality. It becomes increasingly difficult with increasing pile dimensions. Currently 12 MegaWatt wind turbines are being developed. Even larger wind turbines are expected. Dimensions of the monopile foundation will increase accordingly, in particular the diameter and height of the pile.

When a monopile foundation is installed the pile is lifted vertically by a crane and positioned on the desired installation location on the seabed. By self-weight the pile will sink and penetrate itself partly into the soil. This is called self-weight penetration. The crane is subsequently disconnected and a hammer is put on top of the pile to drive the pile further into the ground until the predetermined penetration depth is reached, i.e. final penetration. Between the self-weight penetration and the final penetration the monopile is not stable in a first phase. The monopile therefore needs to be held upright until it is driven far enough into the ground that the monopile remains stable by itself. A pile guiding system provided on the vessel is often used to hold the pile.

As the pile extends above and below the sea water level the pile will experience the sea state at the installation location. In particular the waves will cause the pile to move when the pile is not yet at its final, stable penetration depth. The pile tends to pivot about its bottom end which is positioned in the seabed. Said movements are taken up by the pile guiding system and subsequently transferred to the vessel. These loads can be large, hence the connection between the pile guiding system and the vessel has to be strong. Said strength requirement results in heavy structures. With increasing pile dimensions the loads increase accordingly, in particular quadratically, resulting in even heavier structures.

Traditionally monopiles are installed using jack-up vessels which are standing on the seabed and can hold the pile without being pushed from position. However, there is a growing desire to install wind turbines using a floating vessel. A floating vessel tends to be faster. A floating vessel can install piles in greater water depths. A floating vessel is not limited by seabed soil conditions, because the jack-up vessel stands on the seabed.

A disadvantage of floating vessels compared to jack-up vessels is that floating vessels are more prone to the sea state than jacked-up vessels. Wind, wave and current forces act on the floating vessel, thereby pushing the vessel from position. A positioning system is meant to keep the vessel at a predetermined position.

In addition, when the pile is held by a floating vessel, horizontal forces exerted on the pile will also act on the vessel, pushing the floating vessel from position. This needs to be counteracted by the positioning system.

The pile will push with increasing force on the floating vessel when a pivot angle, or the inclination of the pile increases. The floating vessel therefore has to provide an increasing restoring force on the pile in order to pivot the pile back to its predetermined, desired orientation. This is usually a vertical orientation. Beyond a certain pivot angle the force of the pile on the vessel will become so large that the floating vessel is unable to provide the required force for pivoting the pile back to said desired orientation.

Instead, or in addition to a pivoting movement of the pile, the floating vessel itself may, due to wave loads, move from its desired position while holding the pile. As the floating vessel is holding the pile, the pile will pivot together with the movement of the floating vessel. Moving the floating vessel back to its desired position therefore becomes increasingly difficult, because of the force the pile in turn exerts on the floating vessel.

When the pile is lowered to the seabed by an on-board crane on a floating vessel, the installation complexity is further increased. Lowering the pile towards the seabed with the on-board crane is difficult, because of the lateral and/or swinging motions of the pile induced by the waves and induced by the movement of the on-board crane relative to the pile. These pile movements can lead to excessive loads on the vessel's crane.

Once the pile is on the seabed and the bottom end of the pile is laterally restrained, for example by the seabed itself, the pile gradually becomes supported more and more by the seabed and less by the on-board crane when lowered further. As a horizontal movement of the vessel corresponds to a horizontal movement of the on-board crane, a movement of the vessel may translate into a horizontal movement of an upper end of the pile, because the crane rigging lines will provide a horizontal force on the upper end of the pile. As the bottom end of the pile is laterally restrained, the horizontal force on the upper end of pile will cause a pivoting movement of the pile about the seabed. When using a pile guiding system that holds the pile during lowering thereof, the force that the pile exerts on the pile guiding system when inclined is transferred to the vessel. The pushing force of the pile on the pile guiding system therefore pushes the vessel further out of position. There is a risk that the positioning system of the vessel, in particular a Dynamic Position system, is not able to counter the pushing force of the pile on the pile guiding system, resulting in an unstable system.

OBJECT OF THE INVENTION

It is an object of the invention to provide an improved method of installing a pile in a seabed.

It is an object of the invention to provide an improved method of installing a pile in a seabed using a floating vessel.

It is an object of the invention to provide a more versatile pile guiding system configured to be provided on a vessel.

It is an object of the invention to provide a more effective pile guiding system which is suitable for increasing pile dimensions.

SUMMARY OF THE INVENTION

In order to achieve at least one object in a first aspect of the invention an assembly is provided for installing a pile in a seabed, the assembly comprising:

a vessel comprising:
- a positioning system for keeping the vessel at an installation location relative to the seabed, the positioning system having a positioning stiffness,
- a pile guiding system configured to guide the pile during installation thereof, the pile guiding system comprising:
  - a base provided on the vessel,
  - a first guiding device connected to the base, the first guiding device being configured to accommodate the pile during installation thereof,
  - a resilient member for providing a resilient connection between the vessel and the pile during installation thereof for allowing relative motions between the pile and the vessel, the resilient member having a connection stiffness,
  - wherein the resilient member is configured and intended to keep a natural period of a pivoting movement of the pile about the seabed caused by waves during installation thereof longer than a dominant wave period of a wave spectrum at the installation location by providing the resilient connection with a low connection stiffness.

The invention also relates to the pile guiding system itself.

The connection stiffness has to be low enough to keep the natural period of a pivoting movement of the pile about the seabed longer than the dominant wave period.

The resilient member provides a resilient, or flexible connection between the pile and the vessel. The resilient connection allows for motions of the pile introduced by first order waves. As a result of the resilient connection the loads on the pile guiding system, in particular on the connection between the first guiding device and the vessel are lower compared to a more rigid connection. This effect becomes increasingly relevant for increasing pile dimensions.

When using an on-board crane for lowering the pile during installation, and the pile is supported partially by the seabed and partially by the on-board crane the resilient connection between the pile and the vessel may prevent the assembly from becoming unstable. If the connection between the pile and the vessel is too rigid, or too stiff, a pushing force of the pile on the vessel, via the pile guiding system, resulting from an inclination of the pile may become too high for the positioning system to counter. This may be in particular relevant for a Dynamic Positioning system. When the positioning system is not able to counter the pushing force of the pile, control of the vessel position is lost and as a consequence the pile may fall over.

As the pile is allowed to pivot about the seabed during installation the lateral support of the soil during the initial phase may be impacted. The lateral support on the pile around seabed level is decreased because of the wiggling of the pile, i.e. the pile may move some of the soil sideways. This may advantageously result in a longer window of being able to adjust the verticality of the pile by either the DP system, the gripper frame or a combination thereof.

In an embodiment of the assembly or the pile guiding system, the resilient member is configured and intended to keep said natural period longer than 1.5 times the dominant wave period of the wave spectrum at the installation location.

In an embodiment of the assembly or the pile guiding system, the connection stiffness is low enough to keep the natural period of the pivoting movement of the pile longer than the dominant wave period, and high enough to provide stability to the pile.

In an embodiment of the assembly or the pile guiding system, the resilient member is provided between the base and the first guiding device and/or between the vessel and the base, and/or wherein the resilient member is provided on the first guiding device for providing the resilient connection between the first guiding device and the pile.

In an embodiment of the assembly or the pile guiding system, the pile guiding system comprises a first actuator for moving the first guiding device relative to the base in a first direction.

In an embodiment of the assembly or the pile guiding system, the pile guiding system comprises a second actuator for moving the first guiding device relative to the base in a second direction, the second direction being perpendicular to the first direction.

In an embodiment of the assembly, the vessel is a floating vessel configured to float during installation of the pile.

In an embodiment of the assembly, the positioning system is a dynamic positioning system (hereafter: DP system) or a mooring system or a combination of both.

Assemblies or pile guiding systems of the prior art provide a more rigid connection between the vessel and the pile. Floating vessels are held in position by a mooring or a DP system. When the pile is held by a floating vessel, horizontal forces exerted on the pile will also act on the floating vessel pushing it from position. It could happen that when the pile is held more rigidly the DP system becomes unstable. This DP instability is mitigated with the present invention because of the resilient connection the resilient member provides.

In an embodiment of the assembly or the pile guiding system, the pile guiding system comprises a second guiding device located at a distance above or below the first guiding device, wherein the first and second guiding device define a guiding opening for accommodating the pile, wherein the first guiding device and the second guiding device are configured to engage an outer surface of the pile for holding the pile.

The distance between the first guiding device and second guiding device is at least one diameter as defined by the guiding opening, preferably at least two diameters.

The second guiding device is able to provide a restoring force when the floating vessel is drifting away from the installation location due to environmental loads and/or tilting of the pile. The tilting of the pile will push the floating vessel away. The second guiding device thus prevents the floating vessel from moving further. In essence the force required to restore the pile verticality does not have to be delivered only by the thrusters of for example the DP system. The second guiding device assists in keeping the floating vessel at the installation location In an embodiment of the assembly or the pile guiding system, the first guiding device and second guiding device are configured to together apply a moment about a horizontal axis to the pile for reorienting the pile from a non-aligned orientation to a predetermined, first orientation, the moment being applied by exerting a first force to the pile in a direction towards the predetermined, first orientation by the first guiding device, and by exerting a second force opposite to the first force to the pile via the second guiding device.

Pile guiding systems of the prior art usually interact with the DP system of the floating vessel by exerting, mainly horizontal, translational loads and substantially no rotational loads, i.e. moments. As a DP system is setup to counter horizontal forces and not rotational loads, pile guiding systems of the prior art are generally required to be coupled with the DP system of the floating vessel.

In the present invention it was found that by applying a restoring moment instead of a restoring force, i.e. a translational loads, to the pile, there is no reaction force pushing the installation vessel from location. This allows for the pile guiding system to not have an interface with the DP system, because the DP system is not sensitive to the loads resulting from the moment applied to the pile. The moment is counteracted by the stability of the vessel.

In an embodiment of the assembly or the pile guiding system, the first guiding device and the second guiding device are configured to exert the respective first force and the second force horizontally on the pile.

In an embodiment of the assembly or the pile guiding system, a resilient member is provided on the second guiding device for providing a resilient connection between the second guiding device and the pile.

In an embodiment the assembly comprises a control unit which is coupled to the pile guiding system, wherein the control unit comprises a sensor for measuring the orientation of the pile during installation, wherein the control unit is configured to move the first guiding device towards the predetermined orientation when the sensor measures a non-alignment of the pile relative to said predetermined, first orientation.

In an embodiment of the assembly, the control unit comprises a sensor for measuring the rate of change of the non-alignment, wherein the control unit comprises a PID controller which actuates the pile guiding system to apply the moment to the pile based on the first orientation as setpoint.

In an embodiment of the assembly, the control unit is not coupled with the dynamic positioning system of the floating vessel.

In an embodiment of the assembly or the pile guiding system, the first guiding device and/or the second guiding device comprises a plurality of engaging members for engaging the pile during installation, wherein in particular the engaging members are placed at regular intervals around the circumference of the pile.

In an embodiment of the assembly or the pile guiding system, wherein the engaging members are connected to their corresponding guiding device via an engaging actuator for moving the engaging member inwardly and outwardly relative to a centre of the guiding opening between a first, outward position, wherein the engaging members do not engage the pile, and a second, inward position, wherein the engaging members engage the pile.

In an embodiment of the assembly or the pile guiding system, the engaging member comprises the resilient member for providing a resilient pile connection between the pile and the respective guiding device. This provides a simple construction.

In an embodiment of the assembly or the pile guiding system, each engaging member comprises a roller.

The roller may be the resilient member. This embodiment is particularly simple and cost effective.

In an embodiment of the assembly or the pile guiding system, a stiffness of the resilient member is adjustable via an adjusting member, wherein the adjusting member is configured to decrease the stiffness to a lower stiffness during a downward moving of the pile into the seabed as the stiffness of the soil increases.

In an embodiment of the assembly or the pile guiding system, the pile guiding system comprises an opening member for opening and closing the guiding opening, the opening member being movable between an open position for positioning the pile in the guiding opening, and a closed position wherein the pile is enclosed by the pile guiding system. This way, the pile can be positioned inside the pile guiding system, and also the vessel can move towards and away from the pile when the opening member is in the open position.

In an embodiment of the assembly or the pile guiding system, the pile guiding system comprises a shielding member for limiting wave loads on the pile by shielding the pile from waves.

Also the shielding tends to act as a barrier for the shock waves or sound generated during pile driving.

In an embodiment of the assembly or the pile guiding system, the shielding member comprises a shielding wall surrounding the first guiding device and/or second guiding device.

In an embodiment of the assembly or the pile guiding system, the shielding wall is closed, and wherein at a lower end of the shielding wall a bubble generating unit is provided, the bubble unit being provided inside an inner volume defined by the shielding wall and around the guiding opening, the bubble generating unit being configured to form a bubble screen around the guiding opening. The bubble screen reduces noise during installation, in particular during pile driving.

Where a bubble screen, when unshielded, will drift off an require a relatively large amount of air, when shielded, the bubble screen will require less volume air to be umped.

In an embodiment of the assembly or the pile guiding system, a plurality of through holes are provided in the shielding wall. This way, water can flow in and out the inner volume defined by the shielding member.

In an embodiment of the assembly or the pile guiding system, the guiding opening of the pile guiding system extends beyond a contour of the floating vessel in top view.

In an embodiment of the assembly, the vessel is a jack-up vessel configured to be jacked-up above a waterline during installation of the pile, the positioning stiffness being substantially infinite.

In an embodiment of the assembly or the pile guiding system, the second guiding device is movable relative to the first guiding device in the first direction via a third actuator and/or in the second direction via a fourth actuator. This embodiment provides versatility to the assembly or pile guiding system.

In an embodiment of the assembly or the pile guiding system, the second guiding device is rigidly connected to the floating vessel or the base. This embodiment provides a simple construction.

In an embodiment of the assembly or the pile guiding system, the pile guiding system comprises a main frame, wherein the first guiding device and second guiding device are connected to each other via the main frame, and wherein the first guiding device and second guiding device are connected to the base frame via the main frame, wherein the main frame is freely movable relative to the base frame in the first direction and/or the second direction.

In an embodiment of the assembly or the pile guiding system, the main frame is connected to the base frame via an intermediate frame, wherein the main frame is connected to the intermediate frame via a first intermediate actuator and/or a second intermediate actuator, wherein the main frame is rotatable relative to the intermediate frame about a first axis by the first intermediate actuator and/or a second axis by the second intermediate actuator.

In an embodiment of the assembly or the pile guiding system, the first direction defines the first axis, and wherein the second direction defines the second axis, and wherein the first direction and second direction are horizontal or substantially horizontal.

In an embodiment of the assembly or the pile guiding system, the first intermediate actuator and the second intermediate actuator extend upwards from the intermediate frame towards the main frame.

In an embodiment of the assembly or the pile guiding system, the first intermediate actuator comprises a first resilient member, and wherein the second intermediate actuator comprises a second resilient member.

In an embodiment of the assembly or the pile guiding system, the pile guiding system is configured to apply the moment to the pile by rotating the main frame about the first axis with the first intermediate actuator and/or the second axis with the second intermediate actuator.

The upward orientation of the first and second intermediate actuator allow the forces that constitute the moment to be applied upwards, or vertically. The first guiding device and second guiding device thereby exert the first force and second force substantially horizontally on the pile. The upward, or vertical application of the forces by the first and second intermediate actuator allow a further decoupling between the pile guiding system and the DP system, because the vessel compensates vertical loads easier than horizontal loads.

In an embodiment the assembly or the pile guiding system comprises a dampening member for dampening the motions between the pile and the vessel.

The dampening member may help for example during lowering the pile towards the seabed, because motions of the pile caused by waves and/or movement of the crane can be dampened.

In an embodiment of the assembly or the pile guiding system, the pile guiding system extends above the deck of the floating vessel and/or below a keel of the floating vessel.

The first aspect of the invention also relates to a method for installing a pile with a vessel, the method comprising the steps:
 a) providing an assembly according to any one of the preceding assembly claims at an installation location,
 b) positioning the pile in an upright orientation in the pile guiding system,
 c) lowering the pile to the sea bed,
 d) installing the pile into the seabed,
  wherein the natural period of the pivoting moment of the pile during a phase of installation in which the pile has not reached a self-stabilizing penetration depth is kept longer than the dominant wave period at the installation location by the pile guiding system.

Phases of installation may be, but are not limited to, lowering the pile into the seabed while being at least partially suspended by an on-board crane, repositioning the pile, driving the pile into the ground.

In an embodiment of the method, during lowering of the pile to the seabed, the pile motions are dampened by a dampening member.

In an embodiment of the method, the natural period of the pivoting movement of the pile during installation is kept longer than the dominant wave period at the installation location by adjusting the connection stiffness of the resilient member.

In an embodiment of the method, the natural period of the pivoting moment of the pile is brought from a natural period higher than the dominant wave period to a natural period lower than the dominant wave period when the pile has reached a predetermined penetration depth.

In an embodiment of the method, a dampening member is used for dampening the pile motions, and/or wherein negative stiffness is provided for achieving a natural period lower than the dominant wave period.

In a second aspect the invention provides a method of installing a pile into a seabed with a floating vessel, the method comprising the steps:
 a) providing the floating vessel and a pile guiding system connected to said floating vessel via a base frame at an installation location, wherein the pile guiding system comprises a guiding opening for accommodating the pile during pile installation,
 b) positioning the pile in the guiding opening of the pile guiding system,
 c) lowering the pile to the sea bed,
 d) fixing a bottom end of the pile to the seabed in a horizontal direction,
 e) moving the pile downwards into the seabed in a predetermined, first orientation, in particular a vertical orientation, by exerting a downward force on the pile wherein at least during step e) or after step d) when the pile becomes non-aligned with the predetermined first orientation, the pile is reoriented from a second non-aligned orientation back to the predetermined first orientation by applying a moment about a horizontal axis on the pile with the pile guiding system.

By applying a restoring moment instead of a restoring force, the reaction force is not pushing the floating vessel from position.

In an embodiment of the method, the guiding system comprises a first guiding device and a second guiding device located at a distance above or below the first guiding device, wherein the first and second guiding device define the guiding opening, wherein the first guiding device and the second guiding device are configured to engage an outer surface of the pile for holding the pile, wherein the moment is applied to the pile by exerting a first force to the pile via the first guiding device in a direction towards the first orientation, and exerting a second force opposite to the first force to the pile via the second guiding device, wherein the first force and the second force together constitute the moment.

In an embodiment of the method, the first force and the second force act horizontally on the pile.

In an embodiment of the method, a pile connection between the pile guiding system and the pile and/or a vessel connection between the pile guiding system and the floating vessel comprises one or more resilient members for allowing relative motions between the pile and the floating vessel.

In an embodiment of the method, the first guiding device is connected to the base frame and movable relative to the base frame via a first actuator in a first direction and/or a second actuator in a perpendicular, second direction, wherein during step e) or after step d) the first actuator and/or the second actuator are configured to keep the first guiding device substantially stationary relative to the installation location in a plane defined by the first direction and the second direction while moving the first guiding device relative to the floating vessel.

In an embodiment of the method, the first guiding device is configured to apply a predetermined force on the pile, wherein the magnitude of the predetermined force is based on the deviation of the pile from the predetermined first orientation.

In an embodiment of the method, the second guiding device is rigidly connected to the floating vessel, wherein during the reorientation the first guiding device is configured to apply the first force to the pile and the second guiding device exerts the second force on the pile.

In an embodiment of the method, the second guiding device is movable relative to the first guiding device via a third actuator and/or a fourth actuator in the first direction and/or second direction, respectively, wherein during the reorientation the second guiding device moves in the opposite direction of the first guiding device.

In an embodiment of the method, a control unit is provided which is coupled to the pile guiding system, wherein the control unit comprises a sensor for measuring the orientation of the pile during installation, wherein when during step e) or after step d) the sensor measures a non-alignment of the pile with the predetermined first orientation the control unit actuates the pile guiding system to apply the moment to the pile.

In an embodiment of the method, the control unit comprises a sensor for measuring the rate of change of the non-alignment, wherein the control unit comprises a PID controller which actuates the pile guiding system to apply the moment to the pile based on the first orientation as set point.

In an embodiment of the method, the first force is exerted on the pile by moving the first guiding device relative to the base frame by the first actuator and/or second actuator in the direction of the predetermined, first orientation.

In an embodiment of the method, the first orientation is a vertical orientation or a substantially vertical orientation.

In an embodiment of the method, the pile guiding system comprises an opening member for opening and closing the guiding opening, the opening member being movable between an open position for positioning the pile in the guiding opening, and a closed position for enclosing the pile when the pile is positioned in the guiding opening, wherein prior to step b) the opening member is in the open position, and wherein after step d) the opening member is in the closed position.

In an embodiment of the method, the floating vessel comprises a positioning system configured to keep the floating vessel within a predetermined area, wherein the first guiding device is movable relative to the floating vessel over the predetermined area via the first actuator and/or the second actuator.

In an embodiment of the method, the positioning system is a dynamic positioning system.

In an embodiment of the method, the positioning system is a spread mooring system.

In an embodiment of the method, during step d) the bottom end of the pile is fixed in the horizontal direction by allowing the bottom end of the pile to penetrate the sea bed by using self-weight of the pile or by positioning the bottom end of the pile in a retaining device, the retaining device being located on the seabed at the installation location and configured to prevent horizontal movements of the bottom end of the pile.

In an embodiment of the method, the guiding opening of the pile guiding system extends beyond a contour of the floating vessel in top view.

In an embodiment of the method, the first guiding device and/or the second guiding device comprises a plurality of engaging members for engaging the pile during installation, wherein in particular the engaging members are placed at regular intervals around the circumference of the pile during step e).

In an embodiment of the method, the engaging members are connected to the corresponding guiding device via an engaging actuator for moving the engaging member inwardly and outwardly relative to a centre of the guiding opening between a first position, wherein the engaging members do not engage the pile, and a second position, wherein the engaging members engage the pile.

In an embodiment of the method, the engaging member comprises the resilient member for providing the resilient pile connection between the pile and the respective guiding device.

In an embodiment of the method, each engaging member comprises a roller.

In an embodiment of the method, a stiffness of the resilient member is adjustable via an adjusting member, wherein the adjusting member decreases the stiffness to a lower stiffness during the downward moving of the pile into the seabed when the stiffness of the soil increases.

In an embodiment of the method, the first guiding device and the second guiding device are connected to each other via a main frame, wherein the main frame is connected to the base frame and freely movable relative to said base frame in a first direction and/or a transverse, second direction.

In an embodiment of the method, the main frame is connected to the base frame via an intermediate frame, wherein the main frame is connected to the intermediate frame via a first intermediate actuator and/or a second intermediate actuator, wherein the main frame is rotatable relative to the intermediate frame about a first axis by the first intermediate actuator and/or a transverse, second axis by the second intermediate actuator, wherein during step e) or after step d) the first intermediate actuator and/or the second intermediate actuator are configured to keep the main frame substantially stationary relative to the pile while moving the main frame relative to the floating vessel.

In an embodiment of the method, the first direction defines the first axis, and wherein the second direction defines the second axis.

In an embodiment of the method, the pile guiding system is configured to apply the moment to the pile by rotating the main frame about the first axis with the first intermediate actuator and/or the second axis with the second intermediate actuator.

In an embodiment of the method, step b) is performed by an on board crane provided on the floating vessel.

In an embodiment of the method, step b) is performed by an upending device for upending the pile from a substantially horizontal orientation on deck to the upright orientation.

In an embodiment of the method, the pile guiding system extends above the deck of the floating vessel and/or below a keel of the floating vessel.

In an embodiment of the method, step e) is performed by a hammering tool.

In a third aspect of the invention a pile guiding system is provided configured to be connected to a floating vessel and configured to assist in keeping the floating vessel at an installation location during installation of a pile into a seabed at the installation location, wherein the pile guiding system comprises:
- a base via which the pile guiding system is configured to be connected to the vessel,
- a first guiding device connected to the base, the first guiding device being configured to hold the pile during installation thereof, wherein the first guiding device is movable relative to the base in a horizontal plane and configured to be kept substantially stationary relative to the installation location during installation of the pile, a first actuator and a second actuator connected to the first guiding device for moving the first guiding device relative to the base in the horizontal plane for keeping the first guiding device substantially stationary relative to the installation location during installation of the pile, a second guiding device located at a distance above or below the first guiding device, the second guiding device being connected to the floating vessel or to the base, wherein the second guiding device comprises a resilient member for providing a resilient connection between the pile and the second guiding device during installation thereof, wherein the first and second guiding device define a guiding opening for accommodating the pile, wherein the first guiding device is movable relative to the second guiding device in the horizontal plane.

In an embodiment of the pile guiding system, the first guiding device is configured to rigidly hold the pile.

In an embodiment of the pile guiding system, the second guiding device is substantially rigidly connected to the floating vessel or to the base and configured to remain stationary relative to the vessel or to the base.

The third aspect further relates to a method for assisting to keep a floating vessel at an installation location during installation of a pile into a seabed at the installation location, the method comprising the steps:

a) providing the floating vessel and a pile guiding system connected to said floating vessel via the base frame at the installation location, b) positioning the pile in the guiding opening of the pile guiding system, c) lowering the pile to the sea bed, d) fixing a bottom end of the pile to the seabed in a horizontal direction, e) keeping the first guiding device substantially stationary relative to the installation location, wherein when the vessel moves away from the installation location, in particular due to environmental forces and/or the forces exerted on the first guiding device by the pile, the second guiding device assists in moving the floating vessel back to the installation location by a force induced by the pile on the second guiding device in a direction towards the installation location.

These and other aspects of the invention will be more readily appreciated as the same becomes better understood by reference to the following detailed description and considered in connection with the accompanying drawings in which like reference symbols designate like parts.

BRIEF DESCRIPTION OF THE FIGURES

FIG. 31 schematically shows a perspective view of another embodiment of an assembly according to the invention, in particular with a jack-up vessel.

FIG. 32 schematically shows an embodiment of a method according to the invention.

FIG. 33 schematically shows an embodiment of another embodiment of a method according to the invention.

FIG. 34 schematically shows a method for moving a pile to its predetermined, first orientation.

FIG. 35 schematically shows an embodiment of a method according to the invention for keeping a vessel at an installation location during installation of a pile.

FIG. 36 schematically shows a graph of a wave spectrum at an installation location.

DETAILED DESCRIPTION OF THE FIGURES

Figure 1:
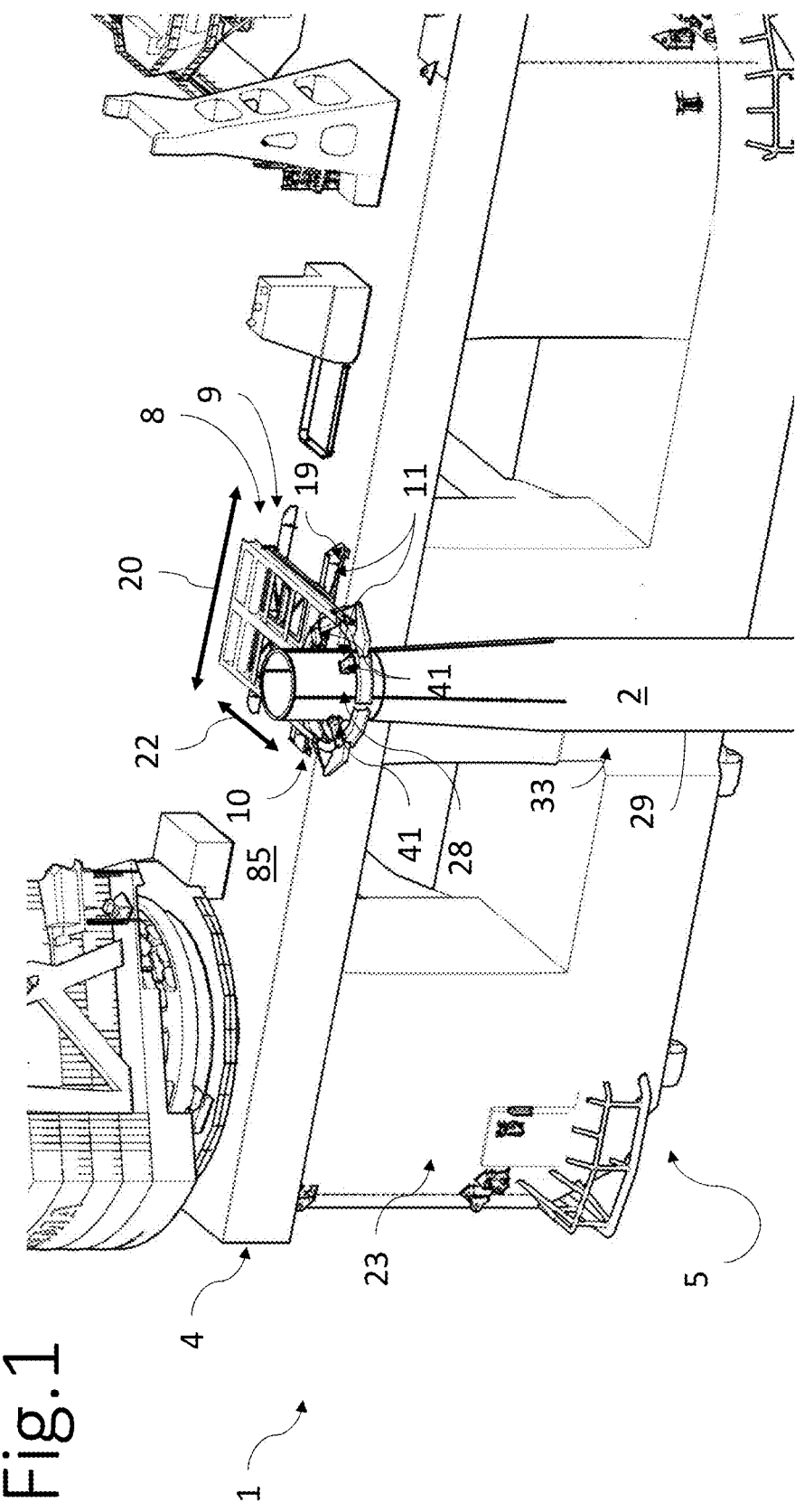
FIG. 1 schematically shows a perspective view of an embodiment of an assembly according to a first aspect of the invention.
Figure 2:
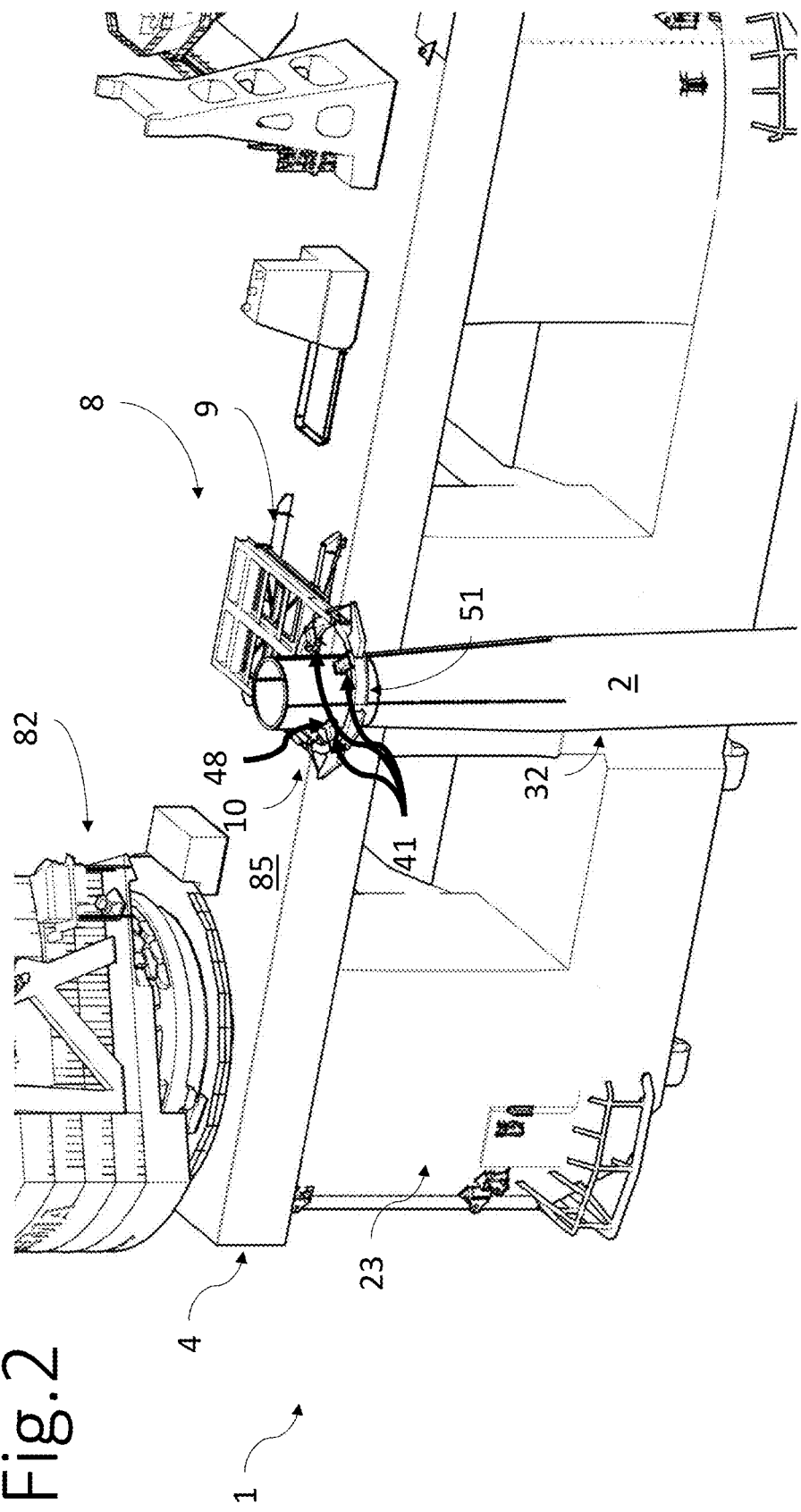
FIG. 2 schematically shows a perspective view of the assembly of FIG. 1 in a second position.

Turning to FIGS. 1 and 2, an embodiment of an assembly 1 for installing a pile 2 in a seabed 3 according to a first aspect of the invention is shown. The assembly 1 comprises a floating vessel 23 with a positioning system for keeping the vessel 4 at an installation location 6 relative to the seabed 3 (see FIGS. 32-35). The floating vessel 23 in the shown embodiment is a semi-submersible vessel 4. The positioning system has a positioning stiffness defined between the installation location 6 and the vessel 4.

The positioning system can be a dynamic positioning system, wherein the floating vessel 23 is kept at the installation location 6 using a control system activating thrusters 96 provided below the vessel 4. For a dynamic positioning system the positioning stiffness is usually programmed in the control system, wherein the thrusters 96 provide increasing thrust when the vessel 4 moves, or drifts, further away from the installation location.

Figure 30:
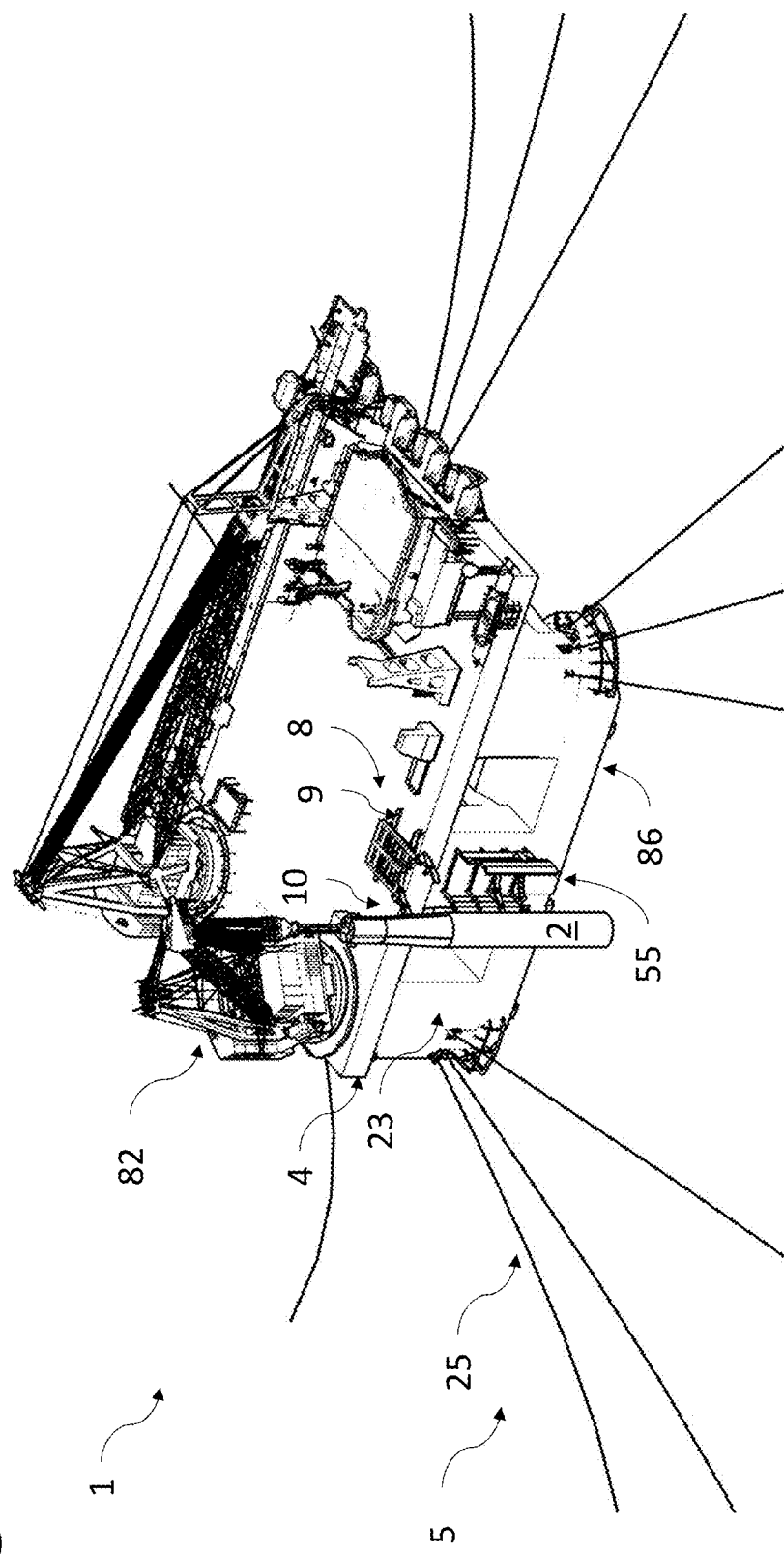
FIG. 30 schematically shows a perspective view of another embodiment of an assembly according to the invention, in particular with a spread mooring system.

The positioning system may also be a spread mooring system 25 deployed by a floating vessel 23, wherein the positioning stiffness is defined by the tension in the mooring lines. See FIG. 30 for an assembly 1 with a spread mooring system 25.

In case a jack-up vessel 61 is used, the positioning stiffness is substantially infinite, because the vessel 4 is standing on the seabed 3 with jack-up legs during installation. See FIG. 31 for an assembly 1 with a jack-up vessel 61, wherein the complete hull of the jack-up vessel 61 is above a not shown waterline 62.

The pile guiding system 8 extends above the deck 85 of the vessel 4 and/or below a keel 86 of the vessel 4. See for example FIG. 31, wherein the shielding wall 55 of the pile guiding system 8 extends below a keel 86 of the jack-up vessel 61, and wherein the first guiding device 10 extends above the deck 85.

The assembly 1 further comprises a pile guiding system 8 configured to guide the pile 2 during installation thereof. The pile guiding system 8 itself is also part of the invention. The pile guiding system 8 comprises a base 9 provided on the vessel 4. A first guiding device 10 is connected to the base 9. The first guiding device 10 is configured to accommodate the pile 2 during installation thereof.

A resilient member 11 provides a resilient connection between the vessel 4 and the pile 2 during installation thereof. The resilient connection allows relative motions between the pile 2 and the vessel 4. The resilient member 11 has a connection stiffness.

The first guiding device 10 comprises the resilient member 11 for providing the resilient connection between the first guiding device 10 and the pile 2. The resilient member 11 may also, or instead be provided between the base 9 and the first guiding device 10 and/or between the vessel 4 and the base 9.

Figure 37:
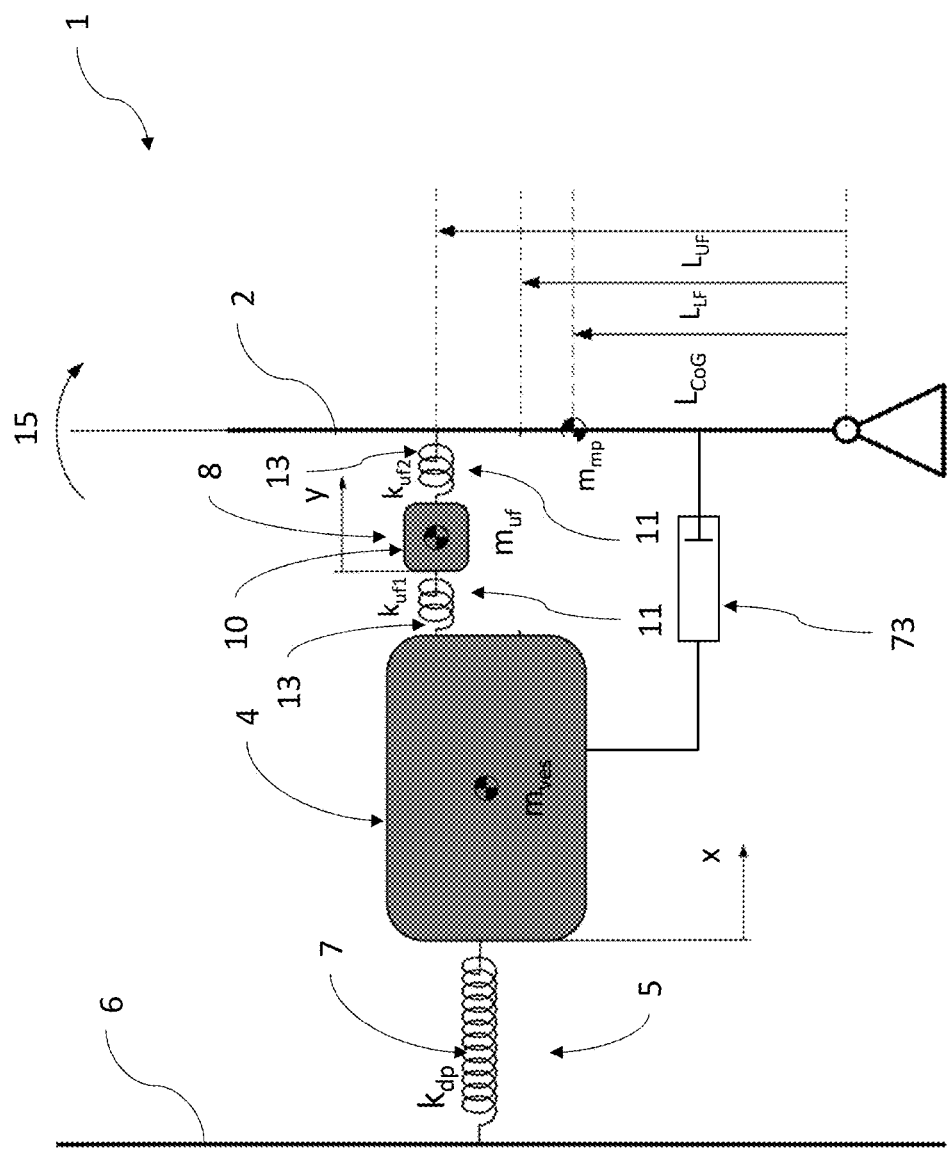
FIG. 37 schematically shows a mass-spring system resembling an embodiment according to an assembly as shown in FIGS. 1 and 2.

FIG. 37 is a schematic depiction of the assembly 1 of FIGS. 1 and 2. The vessel 4 can be seen as connected to the installation location 6 via a positioning system 5 having a positioning stiffness 7. The positioning system 5 can be for example a DP system, a mooring system, or a jack-up system. For the jack-up system the positioning stiffness 7 will be substantially infinite. The pile 2 is connected to the vessel 4 via the pile guiding system 8, in particular via the first guiding device 10. The resilient member 11 in this embodiment is provided between the first guiding device and the vessel, and between the first guiding device and the pile. The pile 2 is presented as an inverted pendulum and can move as such until it has reached a sufficiently deep penetration depth. A dampening member 73 may also be provided in the assembly 1 or pile guiding system 8 to dampen the pile motions between the vessel and the pile 2.

Figure 4:
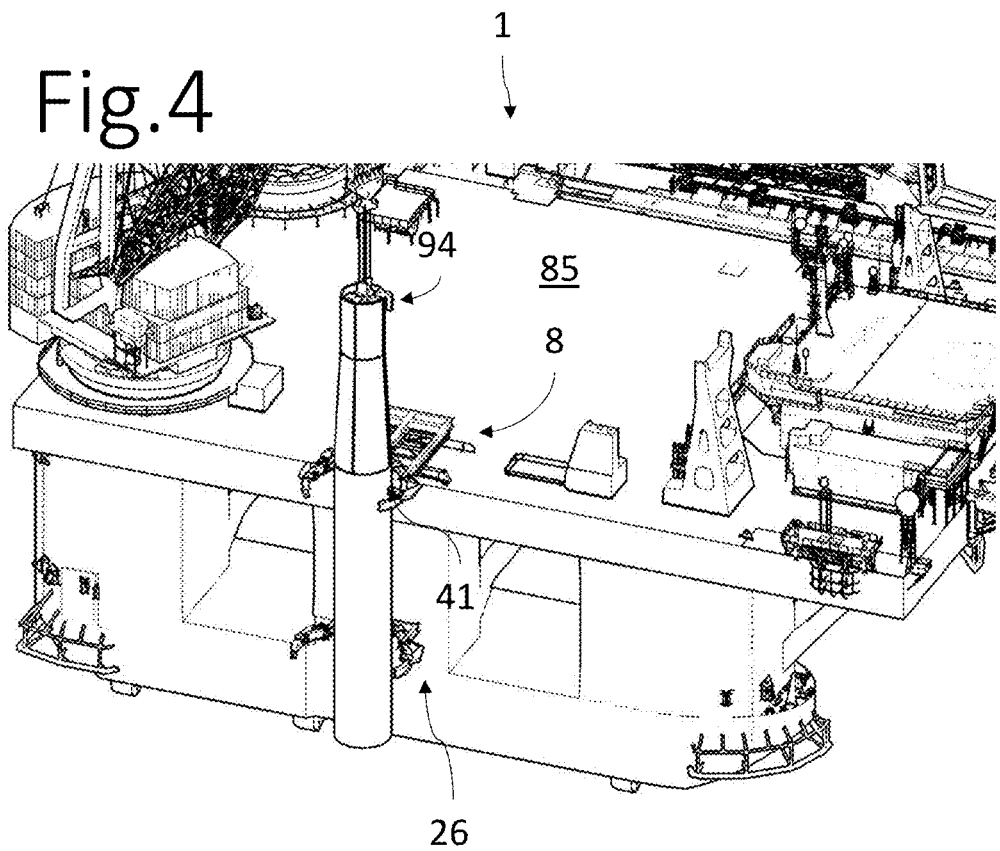
Figure 5:
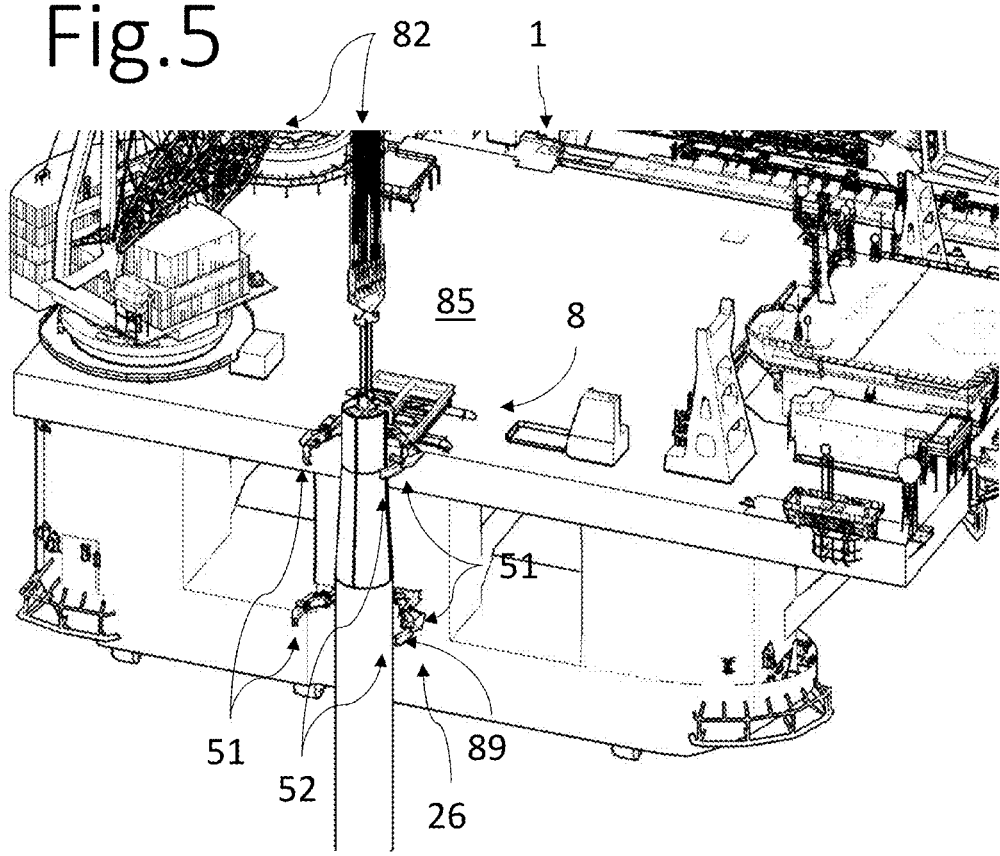

The dampening member 73 may be helpful during lowering the pile towards the seabed, because when the pile is suspended from a crane 82 it may swing or move sideways due to waves or a movement of the crane relative to the installation location. The dampening member 73 may limit the motions of the pile during lowering towards the seabed. In FIGS. 4 and 5 the pile is lowered towards the seabed while the pile guiding system 8 is in the open position 52. The lowering towards the seabed may also be done while the pile guiding system is in the closed position, i.e. enclosing the pile with the first guiding device 10 and/or the second guiding device 26. In the closed position the dampening member 73, for example in the form of one or more hydraulic or pneumatic cylinders or electric motors, may dampen the motions of the pile in an effective manner. Also for the embodiment with only the first guiding device 10, as shown in FIGS. 1 and 2, the dampening member 73 may be advantageously used to dampen the pile motions during lowering of the pile towards the seabed.

The resilient member 11 is configured and intended to keep a natural period 205 of a pivoting movement 15 of the pile 2 about the seabed 3 caused by waves during installation thereof longer than a dominant wave period 203 of a wave spectrum 200 at the installation location 6 by providing the resilient connection with a low connection stiffness 13.

This is further explained with respect to the graph as shown in FIG. 36, wherein a wave spectrum 200 is shown for a chosen installation location 6. The horizontal axis 201 shows the occurring wave periods. The vertical axis 202 shows the spectral density. The peak associated with line 203 shows the dominant, or governing wave period 203 at the installation location 6. The pivoting of the pile 2 tends to be dictated by the waves in the period of said dominant wave period 203. When a natural period 205 of the pivoting movement 15 of the pile 2 coincides with the dominant wave period 203 this can lead to resonance of the pile 2 motions. The dominant wave period 203 depends on the exact installation location, but tends to be in the range of 6-10 seconds during installation.

The pile may thus resonate because of the dominant wave period 203. This is to be avoided. Assemblies or pile guiding systems of the prior art avoid resonance by keeping the natural period 204 of the pile motions lower than the dominant wave period 203. This is achieved by providing a substantially stiff or rigid connection between the pile and the vessel. A disadvantage is that the loads between the pile guiding system and the vessel because of the first order wave forces become large, resulting in a heavy construction. In the present invention it was recognized that providing a resilient connection between pile and vessel allows the natural period 205 of the pile motions to move away from the dominant wave period 203. This way, the pile is allowed to move relative to the vessel, or the pile guiding system, reducing the loads on the pile guiding system.

The pivoting, or oscillating movement of the pile 2 about the seabed 3 is mainly induced by the first order waves at the installation location. The forces on the pile guiding system 8 related to the pivoting movement 15 of the pile 2 can become considerable.

Currently available pile guiding systems solve the problem of the pivoting pile 2 by holding the pile 2 in a stiff manner, i.e. substantially no resilience in the connection between the vessel 4 and the pile 2. This can be beneficial, because the pivoting motions of the pile 2 are kept minimal and no resonance of the pile 2 occurs. Pile stability can be provided by the positioning system. However, a disadvantage of the stiff connection is that the pile guiding system experiences high loads. The high loads have to be taken up by the pile guiding system, resulting in a heavy and cumbersome construction. With increasing pile dimensions, the loads will become higher resulting in even heavier and more cumbersome constructions.

Whereas for the currently available pile guiding systems the natural period 205 of the pivoting movement 15 of the pile 2 is kept lower than the dominant wave period 203 at the installation location, the present invention is based on the insight that the natural period 205 of the pivoting can be kept longer than the dominant wave period 203 by providing a resilient connection between the pile 2 and the vessel 4, wherein the resilient connection has a low stiffness. When the natural period 205 of the pivoting movement 15 of the pile 2 is kept longer than the dominant wave period 203, resonance is prevented. The pile guiding system 8 with a resilient pile 2-vessel 4 connection will experience lower loads compared to the currently available pile guiding system 8 with stiff pile 2-vessel 4 connections. An advantage is that the pile guiding system 8 according to the invention can have a less heavy and less cumbersome construction. With increasing pile dimensions, this positive effect becomes more prominent.

Hence, the resilient member 11 is able to prevent resonance of the pile 2 motions while limiting said pile 2 motions at the same time.

When the pile has been lowered to the seabed by the on-board crane the pile gradually becomes supported more by the seabed and less by the crane as the pile sinks into the seabed by its own weight. During a phase of installation when the pile is at least partially supported by the on-board crane 82 and at least partially by the seabed, A horizontal movement of the vessel, and thus of the crane, relative to the installation location may cause a horizontal movement of an upper end of the pile. The horizontal movement of the upper end follows from a horizontal force exerted on the upper end of the pile by the crane rigging lines. As the bottom end of the pile is horizontally fixed by the seabed or by for example a mudmat, the horizontal movement of the upper end of the pile causes the pile to pivot about the seabed. When the pile is positioned in and enclosed by the pile guiding system 8 the pile will push against the pile guiding system because of the pivoting movement. The pushing force of the pile on the pile guiding system will move the vessel further out of position. When using a pile guiding system with a relatively stiff, or rigid connection the pushing force may become higher than the positioning system can counter. In particular a Dynamic Positioning system may not be able to counter said pushing force of the pile. When this happens, control of the vessel position may be lost and the vessel might pull the pile over by providing a less stiff, or softer connection according to the invention the pile may be kept stable without pushing the vessel out of position.

When the pile has been lowered to the seabed by the on-board crane the pile gradually becomes supported more by the seabed and less by the crane as the pile sinks into the seabed by its own weight. During a phase of installation when the pile is at least partially supported by the on-board crane 82 and at least partially by the seabed, a situation can occur where the pile is no longer stable and could fall over. The resilient member 11 may prevent such an unstable situation by keeping the natural period 205 of the pivoting movement of the pile longer than the dominant wave period 203.

The resilient member 11 is configured and intended to keep said natural period 205 longer than 1.5 times the dominant wave period 203 of the wave spectrum 200 at the installation location.

The connection stiffness is low enough to keep the natural period 205 of the pivoting movement of the pile 2 longer than the dominant wave period 203, and high enough to provide stability to the pile 2.

The pile guiding system 8 comprises a first actuator 19 for moving the first guiding device 10 relative to the base 9 in a first direction 20.

The pile guiding system 8 comprises a second actuator 21 for moving the first guiding device 10 relative to the base 9 in a second direction 22, the second direction 22 being perpendicular to the first direction 20. See for example FIG. 9B or FIG. 10B.

The vessel 4 is a floating vessel 23 configured to float during installation of the pile 2.

The pile 2 is intended to be installed in a predetermined, first orientation 33 (FIG. 1). This usually is a vertical orientation, but may also be a slightly angled orientation. When the pile 2 during installation tilts to an orientation which is non-aligned with the predetermined, first orientation 33, the pile 2 has to be moved back to the predetermined, first orientation 33. Moving the pile 2 back from the non-aligned orientation 32 (FIG. 2) to the predetermined, first orientation 33 can be done by moving the first guiding device 10 relative to the base 9, or vessel 4. The first actuator 19 and the second actuator 21 may be used for moving the first guiding device 10 towards the predetermined, first orientation 33. The first guiding device 10 thereby exerts a first force 34 on the pile 2 in a direction 35 towards the predetermined orientation.

Moving the pile 2 back to the predetermined orientation 33 may also be done by moving the floating vessel 23 in a direction 35 towards the predetermined orientation. A combination of moving the first guiding device 10 and moving the floating vessel 23 is also possible.

Turning to FIGS. 3 to 17, another embodiment of an assembly 1 according to the invention is shown together with a method according to the invention for installing a pile 2 at an installation location 6.

The assembly 1 comprises a pile guiding system 8 as described in relation to FIG. 1. In addition the pile guiding system 8 comprises a second guiding device 26 located at a distance 27 below the first guiding device 10. Providing the second guiding device 26 above the first guiding device 10 is also possible.

The distance 27 between the first guiding device and second guiding device is at least one diameter D1 as defined by the guiding opening, preferably at least two diameters D1. The distance 27 may also be defined in terms of pile diameters D2, wherein the distance 27 is at least one pile diameter D2, preferably at least two pile diameters D2, see FIG. 9B.

Figure 38:
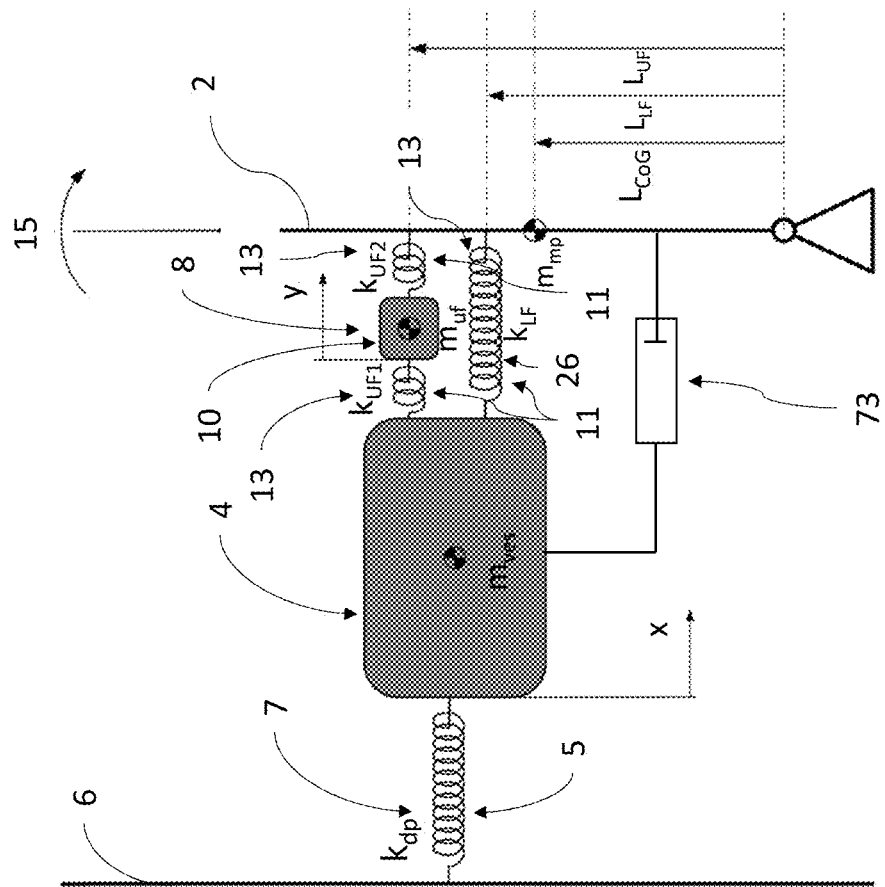
FIG. 38 schematically shows a mass-spring system resembling an embodiment of an assembly according to the invention.

FIG. 38 is a schematic depiction of the assembly 1 comprising a pile guiding system 8 with a first guiding device 10 and second guiding device 26. The second guiding device 26 is depicted as spring. The vessel 4 can be seen as connected to the installation location 6 via a positioning system 5 having a positioning stiffness 7. The positioning system 5 can be for example a DP system, a mooring system, or a jack-up system. For the jack-up system the positioning stiffness 7 will be substantially infinite. The pile 2 is connected to the vessel 4 via the pile guiding system 8, in particular via the first guiding device 10 and the second guiding device 26. The resilient member 11 in this embodiment is provided between the first guiding device and the vessel, between the first guiding device 10 and the pile and between the pile 2 and the vessel via the second guiding device 26. The pile 2 is presented as an inverted pendulum and can move as such until it has reached a sufficiently deep penetration depth. A dampening member 73 may also be provided in the assembly 1 or pile guiding system 8 to dampen the pile motions between the vessel and the pile 2.

The first and second guiding device 10, 26 define a guiding opening 28 for accommodating the pile 2. Said first and second guiding devices 10, 26 are configured to engage an outer surface 29 of the pile 2 for holding the pile 2.

Figure 10A:
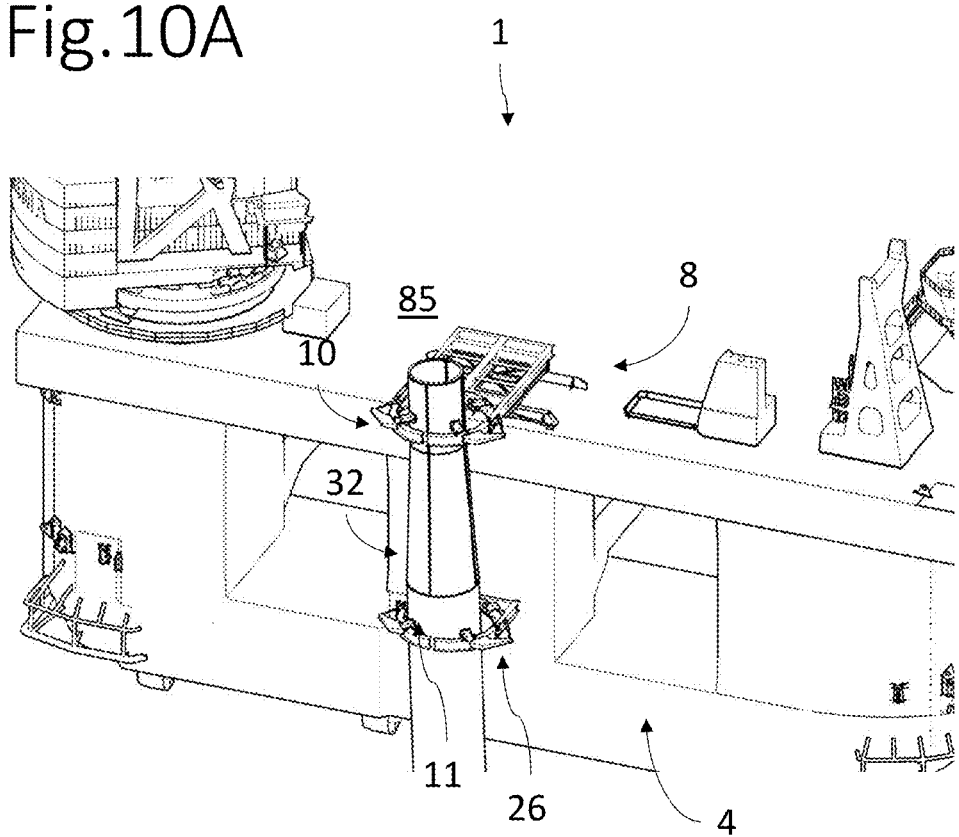
Figure 10B:
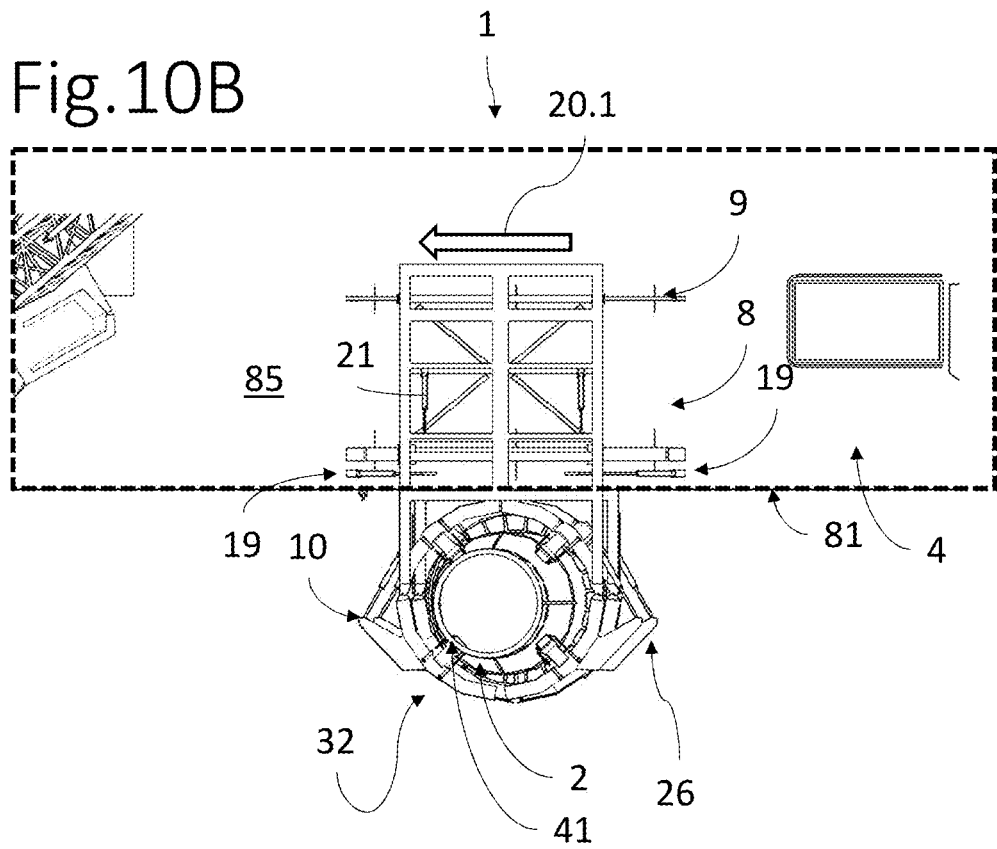

The guiding opening 28 of the pile guiding system 8 extends beyond a contour 81 of the floating vessel 23 in top view, see for example the top view of FIG. 10B.

The first guiding device 10 and second guiding device 26 are configured to together apply a moment 30 about a horizontal axis 31 to the pile 2 for reorienting the pile 2 from a non-aligned orientation 32 to a predetermined, first orientation 33. Said moment 30 is applied by exerting a first force 34 and a second force 36 to the pile 2. The first force 34 is exerted in a direction 35 towards the predetermined, first orientation 33 by the first guiding device 10. The second force 36 is exerted via the second guiding device 26. The direction of the second force 36 is opposite to the first force 34. This will be further explained in relation with FIG. 32.

The first guiding device 10 and the second guiding device 26 exert the respective first force 34 and the second force 36 horizontally on the pile 2.

The second guiding device 26 may have a resilient member 11 for providing a resilient connection between the second guiding device 26 and the pile 2.

The assembly 1 comprises a control unit (not shown) which is coupled to the pile guiding system 8. The control unit comprises a sensor for measuring the orientation of the pile 2 during installation. When the sensor measures a non-alignment of the pile 2 relative to said predetermined, first orientation 33 the control unit is configured to move the first guiding device 10 towards the predetermined orientation via the first 19 and/or second actuator 21.

The control unit may comprise a sensor for measuring the rate of change of the non-alignment, wherein the control unit comprises a PID controller which actuates the pile guiding system 8 to apply the moment 30 to the pile 2 based on the first orientation 33 as setpoint.

The control unit may or may not be coupled with the dynamic positioning system of the floating vessel 23.

The first guiding device 10 and/or the second guiding device 26 comprises a plurality of engaging members 41 for engaging the pile 2 during installation. In the shown embodiments there are four engaging members 41 per guiding device. A different amount of engaging members 41 is also possible.

The engaging members 41 are placed at regular intervals around the circumference of the pile 2, i.e. around the guiding opening 28.

Figure 18:
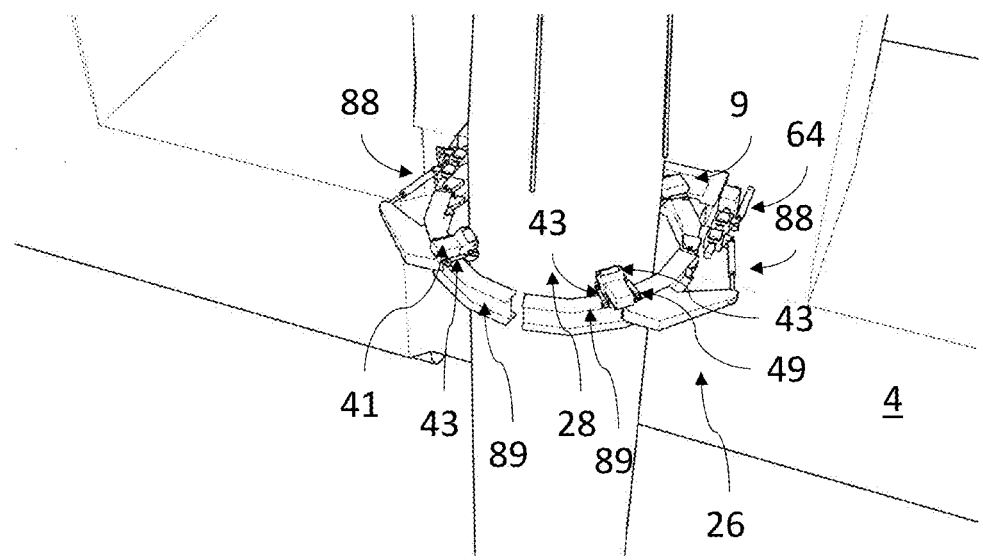
FIGS. 18 and 19 schematically show perspective views of an embodiment of a guiding device.
Figure 19:
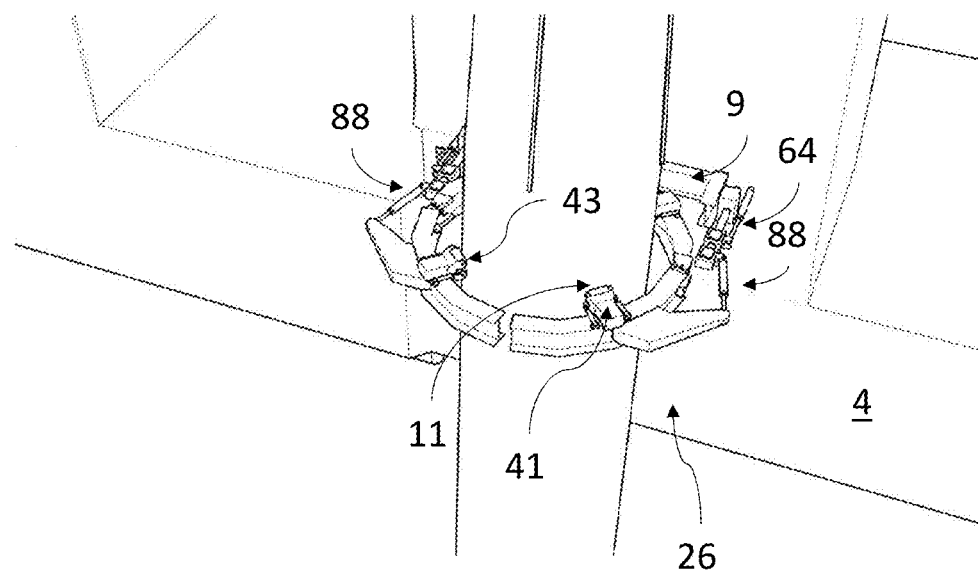

The engaging members 41 are connected to their corresponding guiding device via an engaging actuator 43. The engaging members 41 are shown in FIGS. 18 and 19 for the second guiding device 26. These may be similar for the first guiding device 10. The engaging actuator 43 moves the engaging member 41 inwardly and outwardly relative to a centre 44 of the guiding opening 28 between a first, outward position 45 (FIG. 9B), wherein the engaging members 41 do not engage the pile 2, and a second, inward position 46 (FIG. 9C), wherein the engaging members 41 engage the pile 2.

The engaging member 41 comprises the resilient member 11 for providing a resilient pile 2 connection between the pile 2 and the respective guiding device.

Each engaging member 41 comprises a roller 48. The roller 48 may be the resilient member 11.

The resilient member 11 may comprise a hydraulic cylinder, a pneumatic cylinder, and/or an electric actuator.

A stiffness of the resilient member 11 may be adjustable via an adjusting member 49. The adjusting member 49 is configured to decrease the stiffness to a lower stiffness during a downward 50 moving of the pile 2 into the seabed 3 as the stiffness of the soil increases.

Depending on the soil conditions the natural period 205 of the pivoting movement 15 of the pile 2 will generally decrease when the pile 2 penetrates deeper into the seabed 3. In a sense the pile 2 becomes stiffer. This added stiffness influences the total stiffness of the assembly 1. In order to prevent that the natural period 205 of the pivoting movement 15 of the pile 2 becomes too close to the dominant wave period 203, it may be required that the connection stiffness is decreased. This can be achieved by decreasing the stiffness of the resilient member 11.

The adjusting member 49 can for example be incorporated in the engaging actuator 43, wherein the engaging actuator 43 is configured to provide different levels of resilience.

Figure 17A:
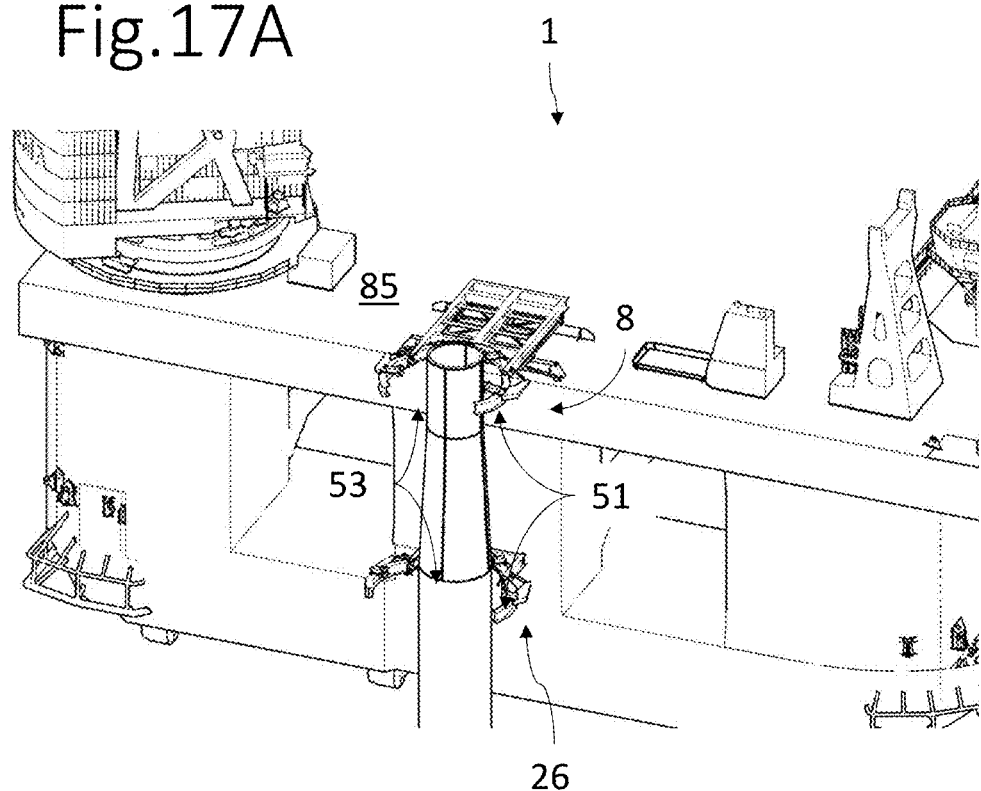
Figure 21:
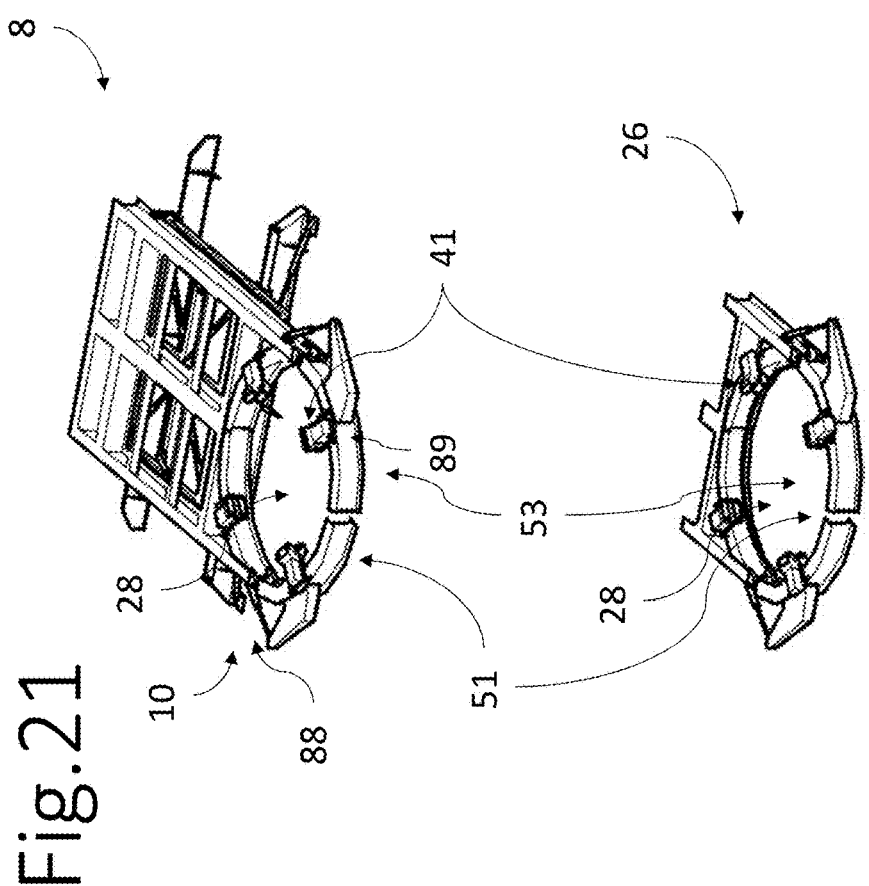
FIGS. 20 and 21 schematically show in perspective views an embodiment of the pile guiding system according to the invention.

The pile guiding system 8 comprises an opening member 51 for opening and closing the guiding opening 28. The opening member 51 is movable between an open position 52 (FIG. 20) and a closed position 53 (FIG. 21). The open position 52 allows a pile 2 to be positioned in the guiding opening 28, see FIGS. 3 to 5. The open position 52 also allows the vessel 4 to move horizontally away from the pile 2, as shown in FIG. 17.

Figure 6:
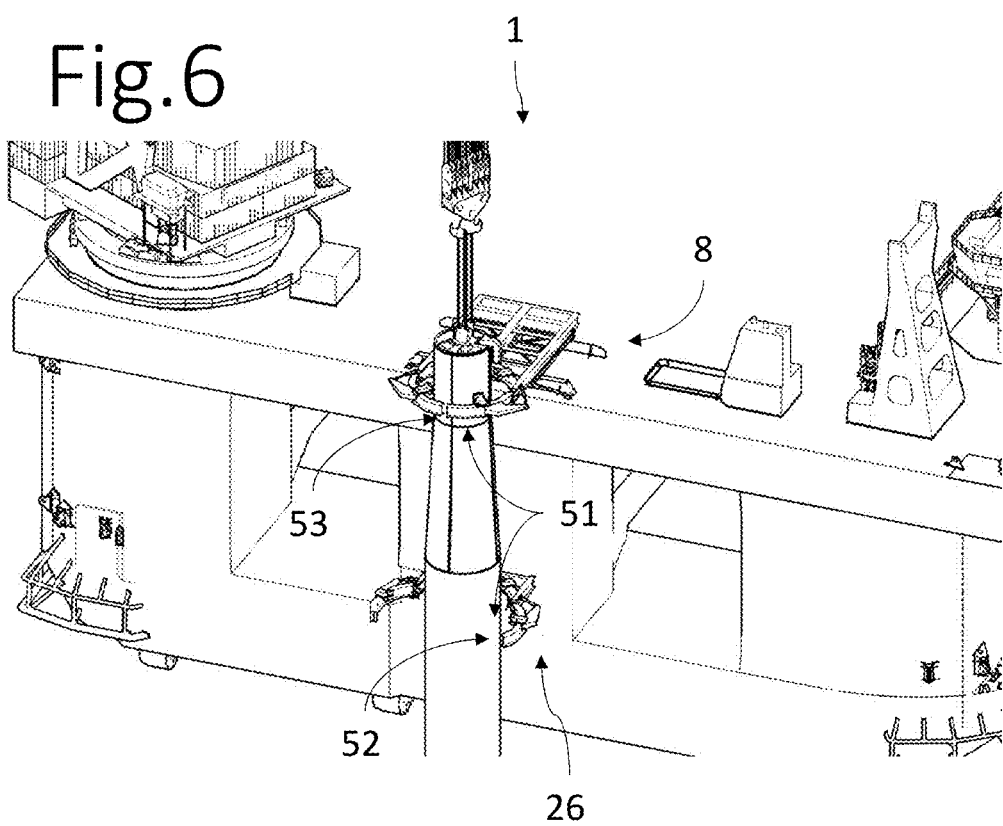
Figure 7:
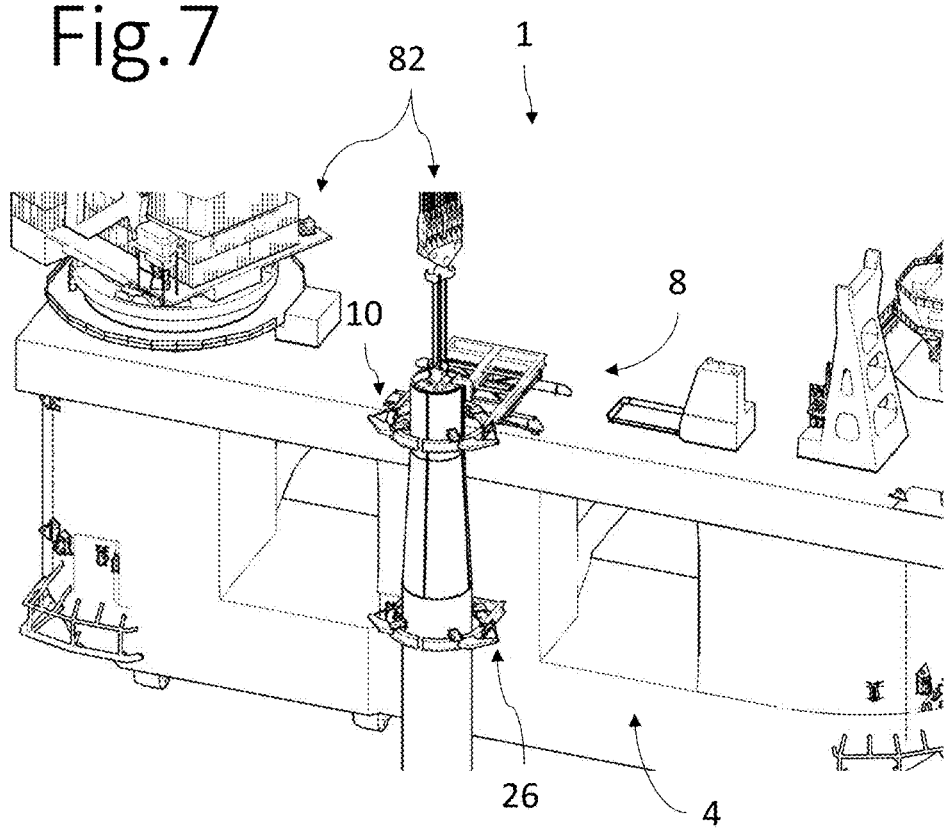
Figure 8:
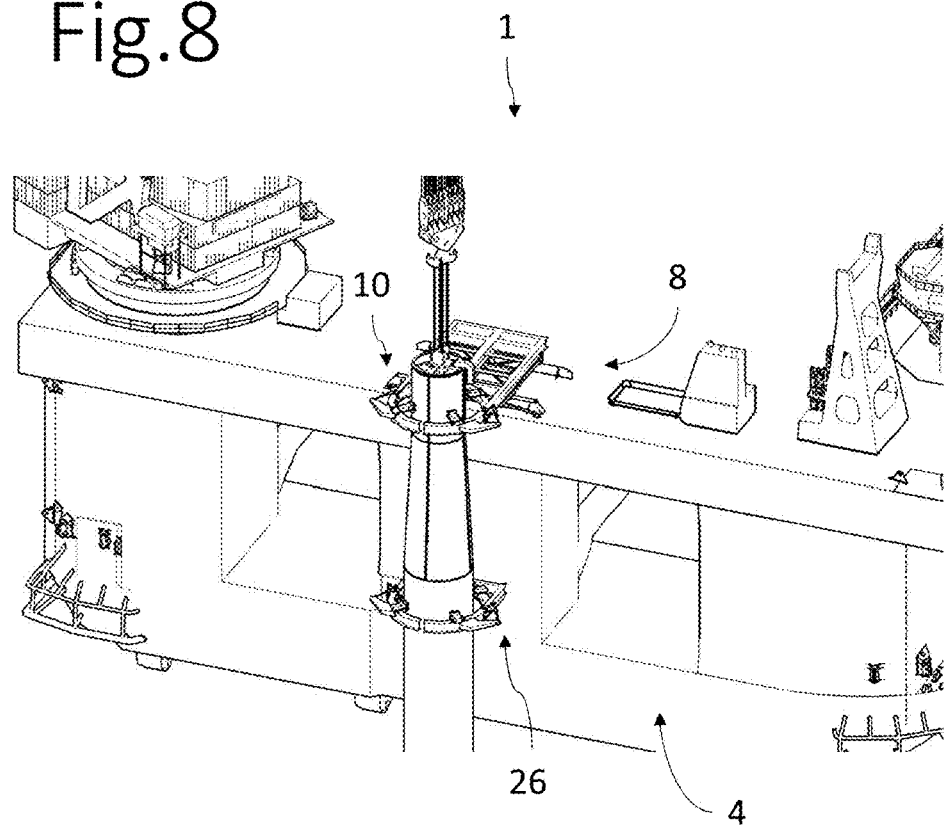

The closed position 53 of the opening member 51 is for example shown in FIG. 6 for the first guiding device 10. For both the first and second guiding device 26 the closed position 53 is shown in for example FIGS. 7-15. In the closed position 53 the pile 2 is enclosed by the pile guiding system 8.

Figure 20:
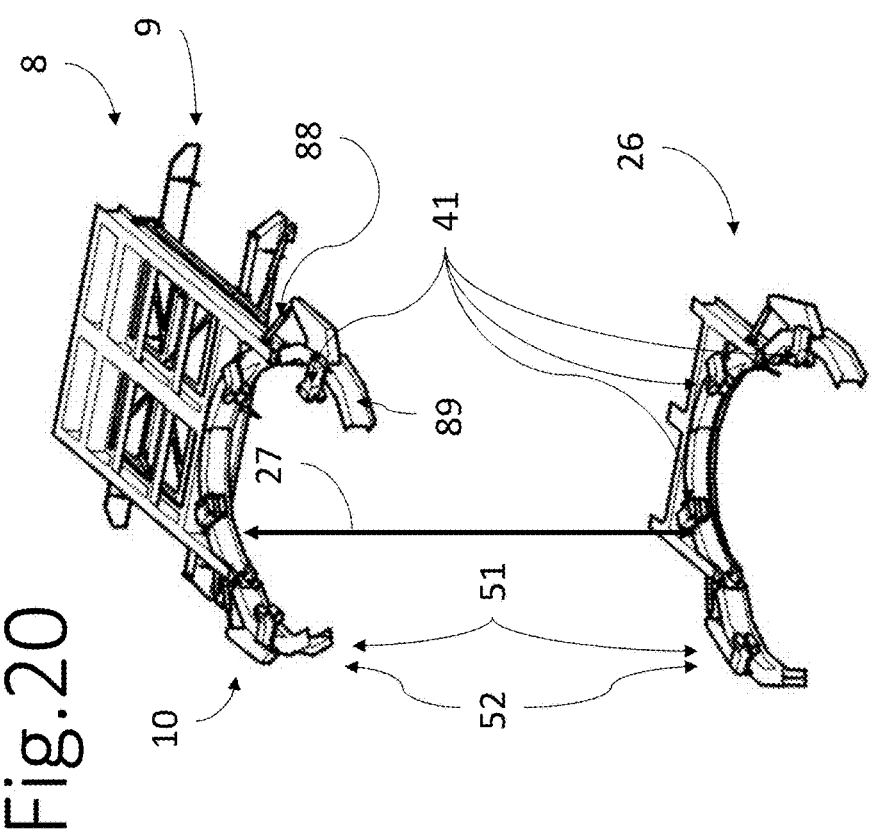
Figure 22:
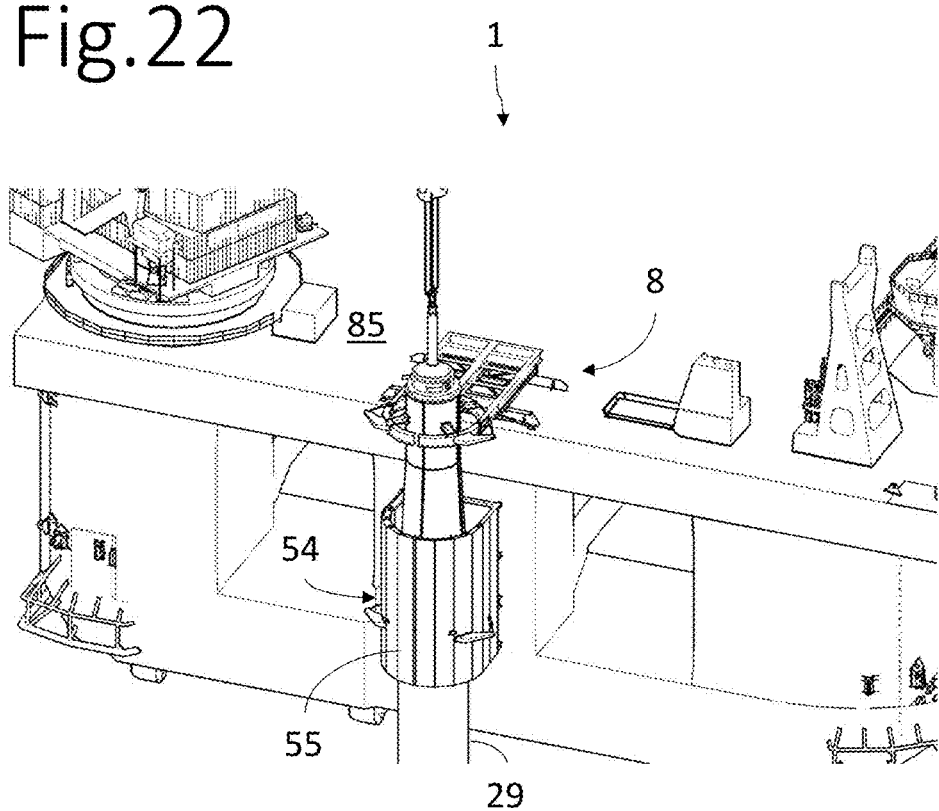
FIGS. 22 and 23 schematically show perspective views of another embodiment of an assembly according to the invention.

The opening member 51 can be moved by opening actuators 88, as shown in FIGS. 20 and 21. The opening member 51 comprises two arms 89 which can pivot about respective pivot axes between the open position 52 and closed position 53. The opening actuators 88 are connected to the arms 89 and the frame. Each arm 89 comprises an engaging member 41.

The second guiding device 26 may be movable relative to the first guiding device 10 in the first direction 20 via a third actuator (not shown) and/or in the second direction 22 via a fourth actuator 64. In FIGS. 18 and 19 two fourth actuators 64 are shown for moving the second guiding device 26 toward and away from the vessel 4, i.e. in the second direction 22. FIG. 19 shows the second guiding device 26 in a position outward from the vessel 4 relative to the position of the second guiding device 26 as shown in FIG. 18. The fourth actuator 64 can be connected to a base 9 or to the vessel 4 itself.

The second guiding device 26 is movable independently from the first guiding device 10. Hence, the second guiding device 26 can move relative to the first guiding device 10.

In another embodiment the second guiding device 26 is rigidly connected to the floating vessel 23 or the base 9. This way, the second guiding device 26 remains stationary relative to the vessel 4.

FIGS. 22 to 25 show another embodiment of the assembly 1 and pile guiding system 8 according to the invention. The assembly 1 may comprise the same features as the assembly 1 and pile guiding system 8 of the previous figures. The embodiment as shown in FIGS. 20-23 further comprises a shielding member 54 for limiting wave loads on the pile 2 by shielding the pile 2 from waves.

The shielding member 54 comprises a shielding wall 55 surrounding the second guiding device 26. The shielding member 54 may also surround the first guiding device 10.

The shielding wall 55 may be closed, i.e. no water can flow through the wall. It may also be possible to provide a plurality of through holes in the shielding wall 55.

Figure 23:
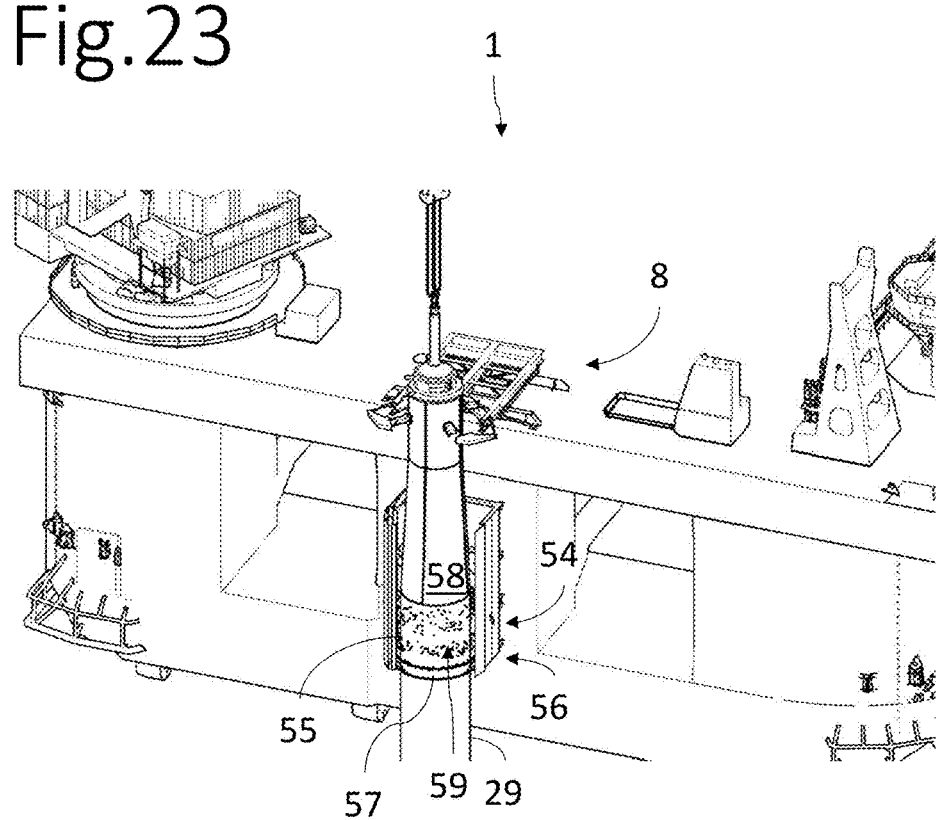
Figure 25:
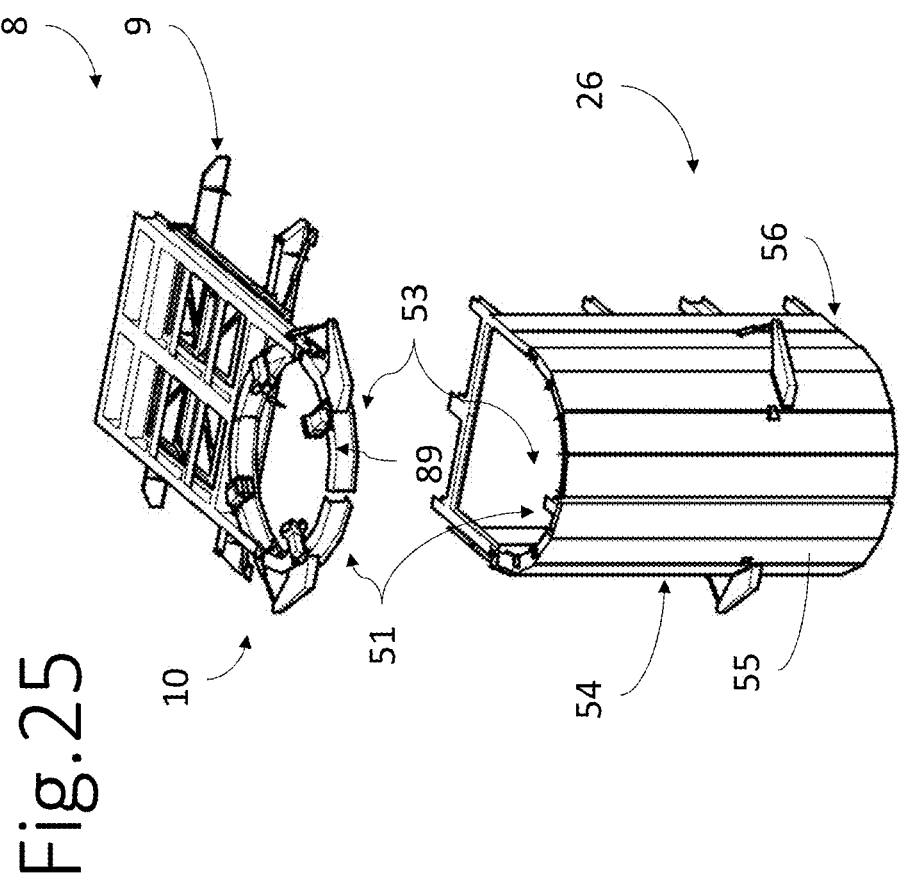
FIGS. 24 and 25 schematically show perspective views of the embodiment of a pile guiding system as shown in FIGS. 22 and 23, in particular with a shielding member.
Figure 24:
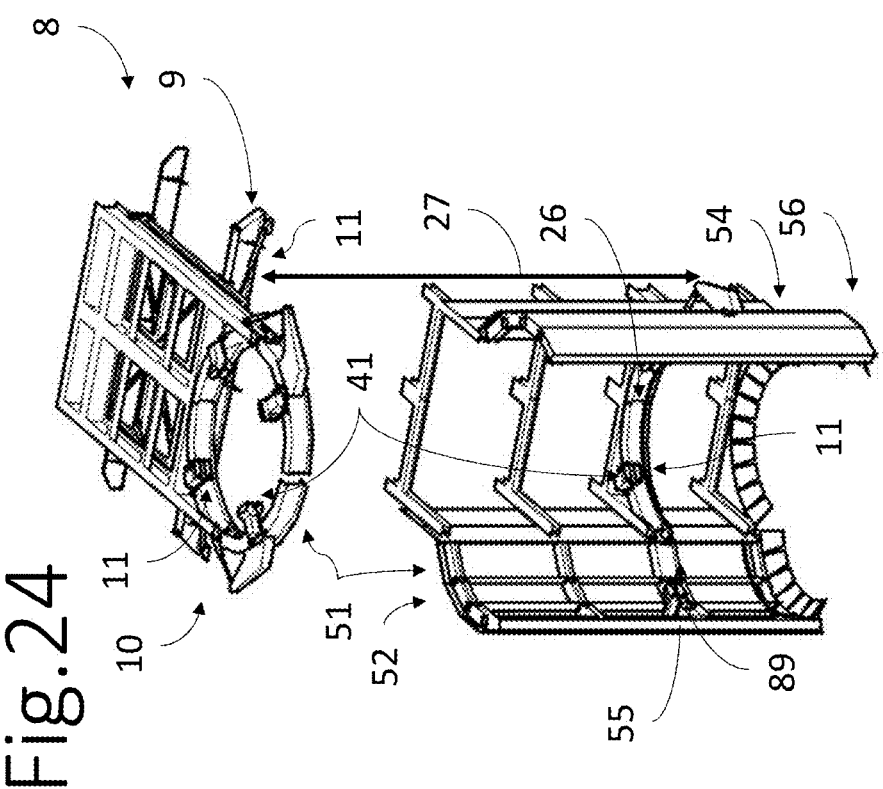
Figure 26:
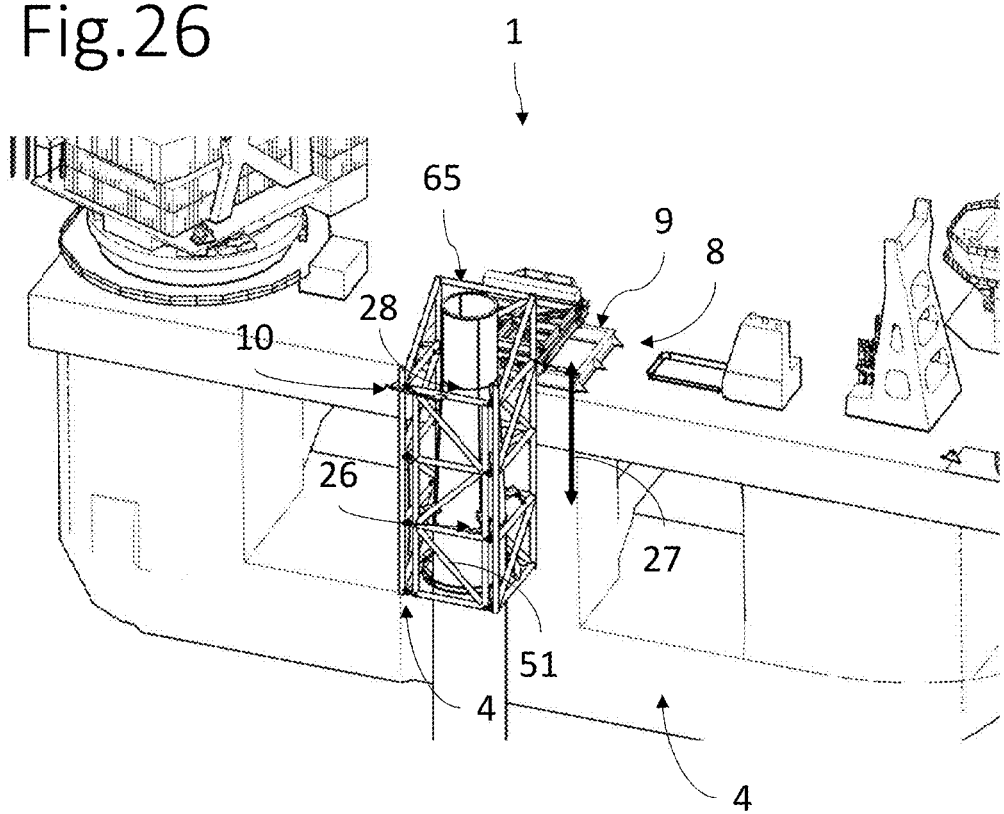
FIGS. 26-29 schematically show perspective views of yet another embodiment of an assembly, a pile guiding system, and a method according to the invention.
Figure 27:
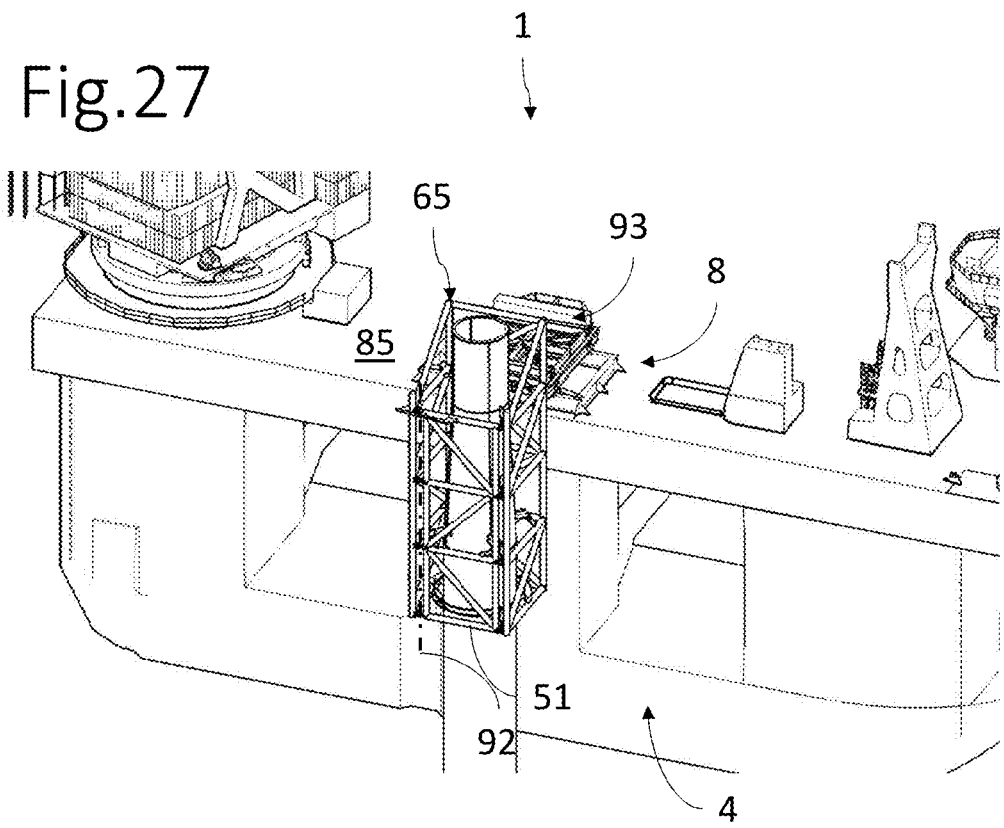

At a lower end 56 of the shielding wall 55 a bubble generating unit 57 is provided, see FIG. 23 wherein a part of the shielding wall 55 is removed to show the bubbles generated by the bubble unit. The bubble generating unit 57 is provided inside an inner volume 58 defined by the shielding wall 55 and around the guiding opening 28, i.e. around the pile 2. The bubble generating unit forms a bubble screen 59 around the guiding opening 28. The bubble screen 59 helps to reduce noise during pile 2 driving. Noise reduction is beneficial, because often the time window for installing piles is limited to for example daylight because of noise regulations. After daylight the maximum allowed noise is lower. With the bubble screen it is possible to reduce installation noise to within the allowed noise after daylight, extending the workability.

Turning to FIGS. 26-29 another embodiment of the assembly 1 and pile guiding system 8 according to the invention are shown. The assembly 1 comprises a vessel 4 and a pile guiding system 8. The vessel 4 shown in the figures is a floating vessel 23, in particular a semi-submersible vessel 4. A jack-up vessel 61 is also possible.

The pile guiding system 8 comprises a main frame 65. The first guiding device 10 and second guiding device 26 are connected to each other via the main frame 65. The first guiding device 10 and second guiding device 26 are connected to the base frame 9 via the main frame 65. The main frame 65 is freely movable relative to the base frame 9 in the first direction 20 and/or the second direction 22.

Freely movable means that no actuators are required to move the main frame 65 relative to the base frame 9. When the pile 2 moves relative to the vessel 4, the main frame 65 can be moved by the pile 2 such that the main frame 65 moves freely relative to the base frame 9 in at least one direction 20, 22.

The main frame 65 is connected to the base frame 9 via an intermediate frame 66. The main frame 65 may also be freely movable relative to the intermediate frame 66. This way, the main frame 65 can freely move relative to the base frame 9 in at least two directions.

Figure 28A:
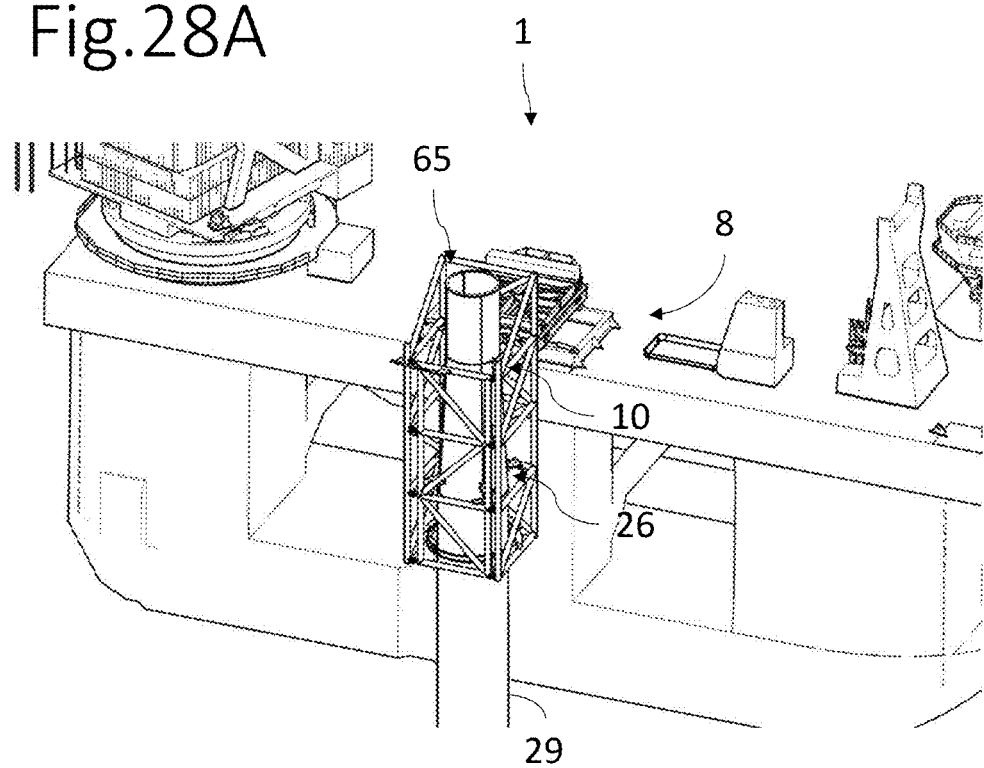
Figure 28B:
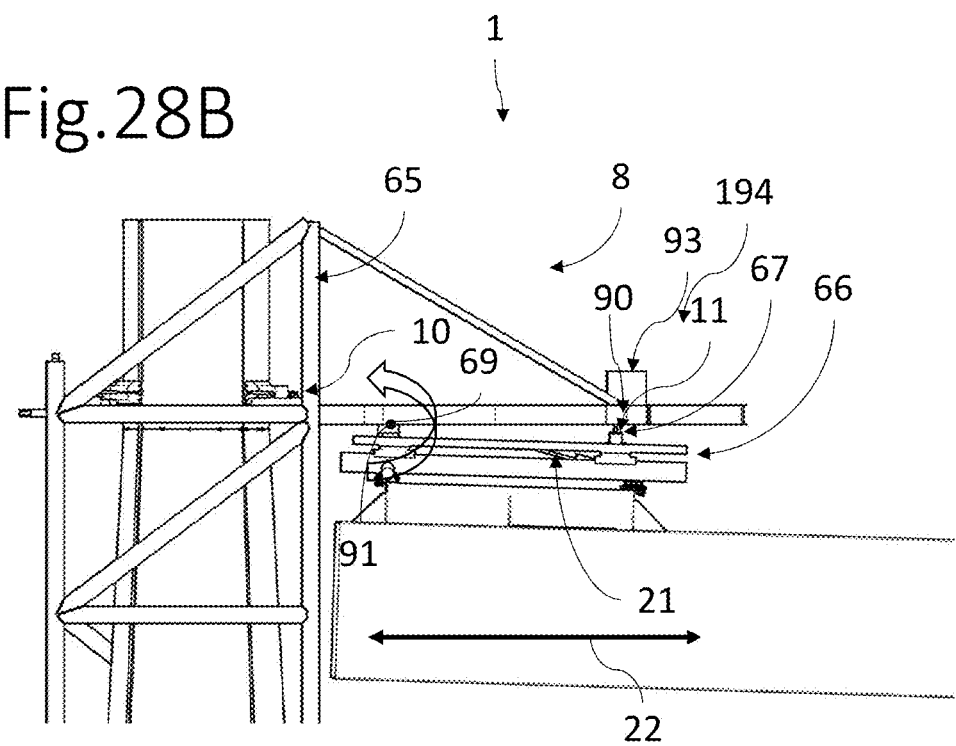

The first direction 20 defines a first axis 69 (FIG. 28B). The second direction 22 defines a second axis 70. The first direction 20 and second direction 22 are horizontal or substantially horizontal.

The main frame 65 is connected to the intermediate frame 66 via a first intermediate actuator 67 and/or a second intermediate actuator, one of which is shown in FIG. 28B. The other intermediate actuator is provided at a distance behind the shown first intermediate actuator 67. The first and second intermediate actuator are configured to rotate the main frame 65 relative to the intermediate frame 66 about a first axis 69 by the first intermediate actuator 67 and/or a second axis 70 by the second intermediate actuator.

When the first and second intermediate actuator both move from a retracted position to an extended position 90 as shown in FIG. 28B, or vice versa, the main frame 65 pivots about the first axis 69 parallel to the first direction 20. The main frame 65 pivots about a pivoting point 91 as shown in FIG. 28B. The pivoting point 91 could be a ball joint.

Figure 29A:
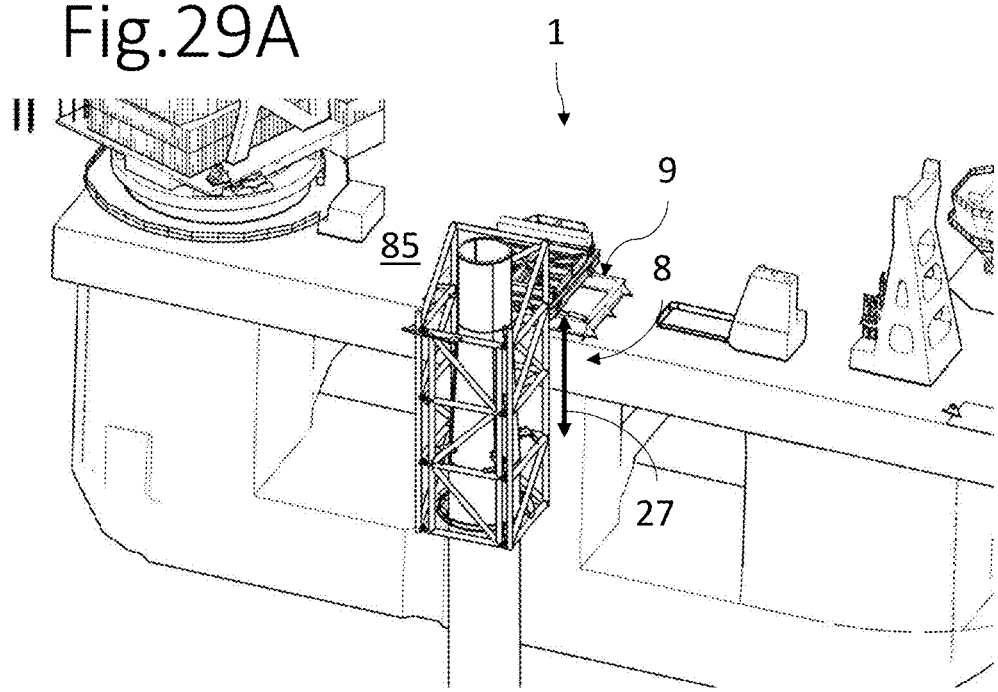
Figure 29B:
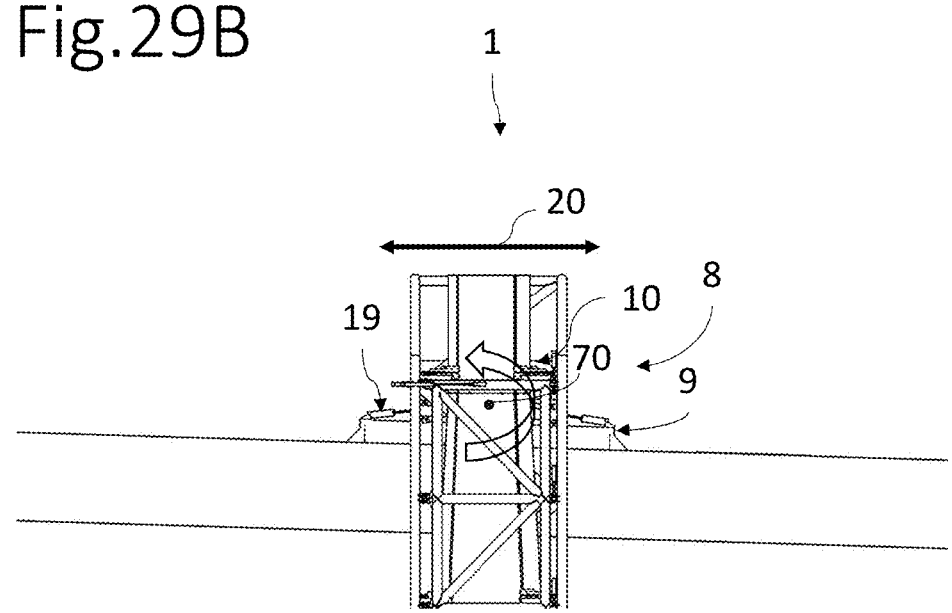

When the first intermediate actuator 67 moves relative to the second intermediate actuator the main frame 65 pivots about the second axis 70 (FIG. 29B). It is also possible to pivot the main frame 65 about another axis within the plane defined by the first axis 69 and second axis 70 by the first and second intermediate actuators. This can for example be achieved by a, in top view, triangular configuration between the first intermediate actuator 67, the second intermediate actuator and the pivoting point.

The first intermediate actuator 67 and the second intermediate actuator extend upwards, preferably vertically, from the intermediate frame 66 towards the main frame 65.

A resilient member 11 may be provided next to the first and/or second intermediate actuators, wherein the one or more resilient members 11 connect the main frame 65 to the intermediate frame 66 or base frame 9.

A resilient member 11 may instead or in addition be provided on the first and/or second guiding devices 10, 26, similar to the embodiments as shown in FIGS. 1-25. A resilient roller may serve as resilient member 11.

The stiffness of the resilient members 11 may be chosen such that the natural period 205 of the pivoting movement 15 of the pile 2 remains longer than the dominant wave period 203.

The first intermediate actuator 67 may comprise a first resilient member 11 and the second intermediate actuator may comprise a second resilient member 11. The resilient function can be integrated in the actuators.

The upwardly or vertically extending intermediate actuators 67 and/or resilient members 11 result in an embodiment wherein the loads are taken up mainly vertically by the vessel 4. A vessel 4 can handle vertical loads better than horizontal loads. Horizontal loads have to be actively countered by thrusters 96 of the vessel 4, whereas vertical loads can be countered by the buoyancy of the vessel 4.

The pile guiding system 8 is configured to apply the moment 30 to the pile 2 by rotating the main frame 65 about the first axis 69 with the first intermediate actuator 67 and/or the second axis 70 with the second intermediate actuator. This way the first guiding device 10 exerts a first force 34 on the pile 2 and the second guiding device 26 exerts the opposite, second force 36 on the pile 2.

In all embodiments a dampening member may be provided for dampening the motions between the pile 2 and the vessel 4. The dampening function may be integrated in one or more of the actuators.

The dampening member 73 is useful when during installation the pile reaches a penetration depth at which the pile become stable by itself, i.e. wherein the pile does not need to be held in order to remain standing upright. There comes a point during installation wherein the natural period of the pile motions will move from natural period 205 towards natural period 204, as indicated in FIG. 36 with arrow 206. That is because the behaviour of the pile will become stiffer with increasing penetration depth. The pile motions will have to go through the dominant wave period. In order to guide this process without incurring resonance the pile motions can be dampened by the dampening member. Providing negative stiffness for bringing the natural period 205 to natural period 204 is also possible The main frame 65 comprises an opening member 51 for opening and closing the guiding opening 28. The opening member 51 is in the form of a door which can pivot about a door pivot axis 92.

A counterweight 93 may be provided at an end 194 of the main frame 65. This may provide a restoring force for keeping the main frame 65 upright, thereby keeping the pile 2 upright. The counterweight is located at or near the intermediate actuators 67, at a distance from the pivoting point 91.

The pile guiding system 8 as described in relation to FIGS. 3-30 is also suitable to assist in keeping the floating vessel 23 at an installation location 6 during installation of a pile 2 into a seabed 3 at the installation location. The pile guiding system 8 comprises a base 9 via which the pile guiding system 8 is connected to the vessel 4.

The first guiding device 10 connected to the base 9 and the first guiding device 10 is configured to hold the pile 2 during installation thereof. The first guiding device 10 is movable relative to the base 9 in a horizontal plane and configured to be kept substantially stationary relative to the installation location 6 during installation of the pile 2.

A first actuator 19 and a second actuator 21 connected to the first guiding device 10 can move the first guiding device 10 relative to the base 9 in the horizontal plane for keeping the first guiding device 10 substantially stationary relative to the installation location 6 during installation of the pile 2.

A second guiding device 26 is provided and located at a distance 27 below the first guiding device 10. The second guiding device 26 may instead be located above the first guiding device 10. The second guiding device 26 is connected to the floating vessel 23 or to the base 9.

The second guiding device 26 is an effective add-on to existing pile guiding systems which have only the first guiding device 10, because the second guiding device 26 provides an anchoring effect between the seabed 3 and the vessel 4 via the pile 2 when the vessel 4 moves away from the installation location. The anchoring effect reduces the power required by the dynamic positioning system or spread mooring positioning system for keeping the floating vessel 23 at the installation location.

The second guiding device 26 comprises a resilient member 11 for providing a resilient connection between the pile 2 and the second guiding device 26 during installation thereof.

The first guiding device 10 is movable relative to the second guiding device 26 in the horizontal plane.

The first guiding device 10 may be configured to rigidly hold the pile 2 while moving relative to the vessel 4, or base 9.

The second guiding device 26 is substantially rigidly connected to the floating vessel 23 or to the base 9 and configured to remain stationary relative to the vessel 4 or to the base 9.

When the vessel 4 moves away from position, the second guiding device 26 will engage the pile 2. The vessel 4 thus pushes the pile 2 via the second guiding device 26 with the previously described second force 36. Because the first guiding device 10 remains stationary relative to the installation location, the pushed pile 2 experiences a first force 34 exerted by the first guiding device 10, which is similar to the first force 34 as previously described. The combination of the first guiding device 10 and the second guiding device 26 thus helps in preventing the vessel 4 from moving away. This will work when the bottom end of the pile 2 is horizontally fixed and increases with increasing penetration depth of the pile 2 into the seabed 3.

Operation

The assembly 1 and the pile guiding system 8 according to the invention comprising a first guiding device 10 and a second guiding device 26 have multiple applications.

A first application relates to a method wherein the pile guiding system 8 comprises a resilient member 11 for keeping the natural period 205 of the pivoting moment 30 of the pile 2 longer than the dominant wave period 203 at the installation location.

Figure 3:
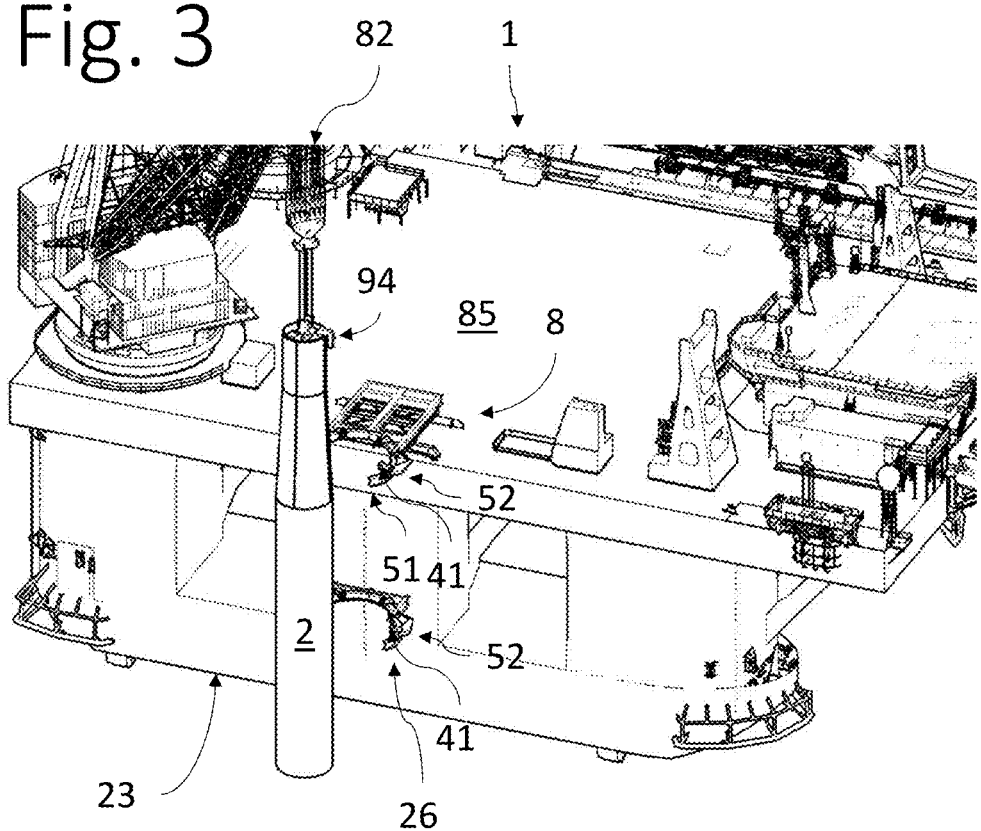
FIGS. 3-17 schematically show perspective views of an embodiment of an assembly and a method according to a first, second and third aspect of the invention.

The method comprising the steps of providing an assembly 1 according to the invention at an installation location. The method comprises positioning the pile 2 in an upright orientation 74 in the pile guiding system 8, as shown in FIGS. 3 and 4. A lifting tool 94 is connected to the pile 2 and a crane 82 lifts and positions the pile 2 in the pile guiding system 8. The opening members 51 are in the open position 52 so that the pile 2 can be positioned in the guiding opening 28 defined by the first and second guiding devices 10, 26.

A next step is lowering the pile 2 to the sea bed, as shown from FIG. 4 to FIG. 5. The opening member 51 is still in the open position 52. It is also possible to lower the pile 2 to the seabed 3 with the opening member 51 in the closed position 53. During lowering the pile towards the sea bed the dampening member 73 may dampen the pile motions.

Figure 13:
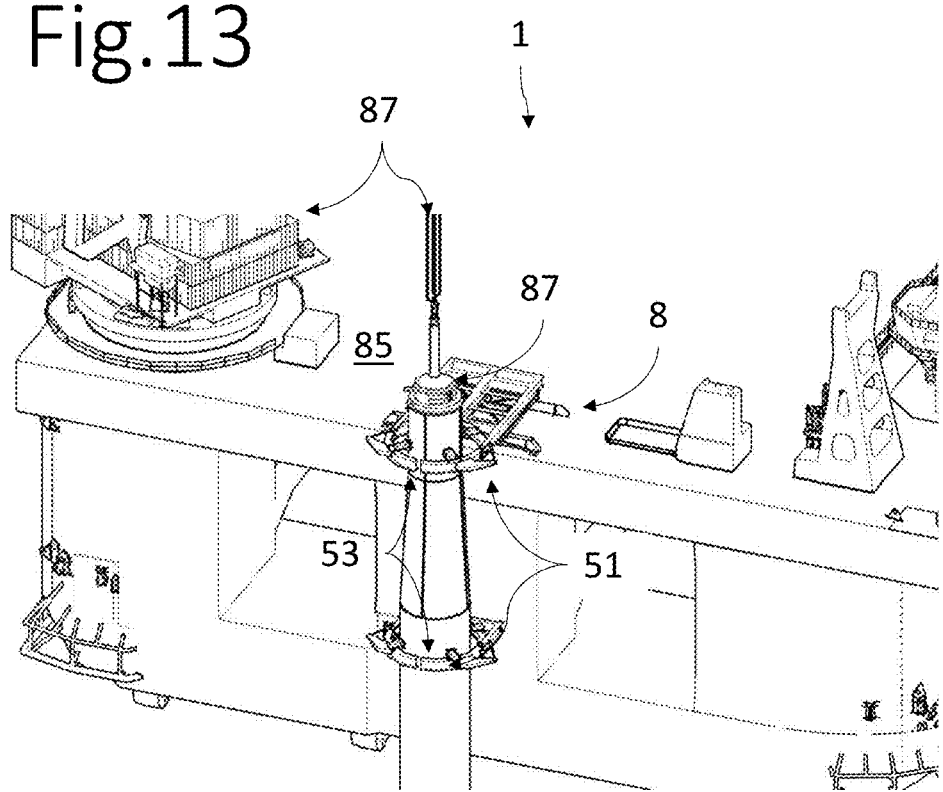
Figure 14:
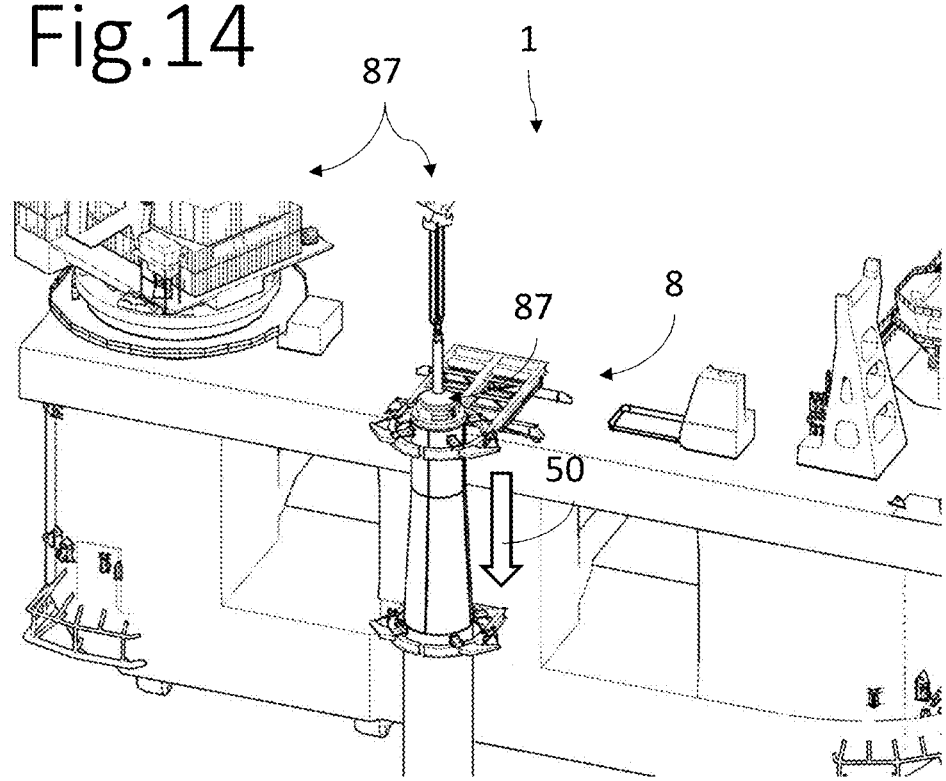

Next the pile 2 is installed into the seabed 3, see FIGS. 13 and 14. The opening members 51 are in the closed position 53. A pile driving tool 87, e.g. a hammer, is attached to a top of the pile 2 via a crane 82. The pile driving tool 87 drives the pile 2 into the seabed 3 to a target depth.

Figure 15:
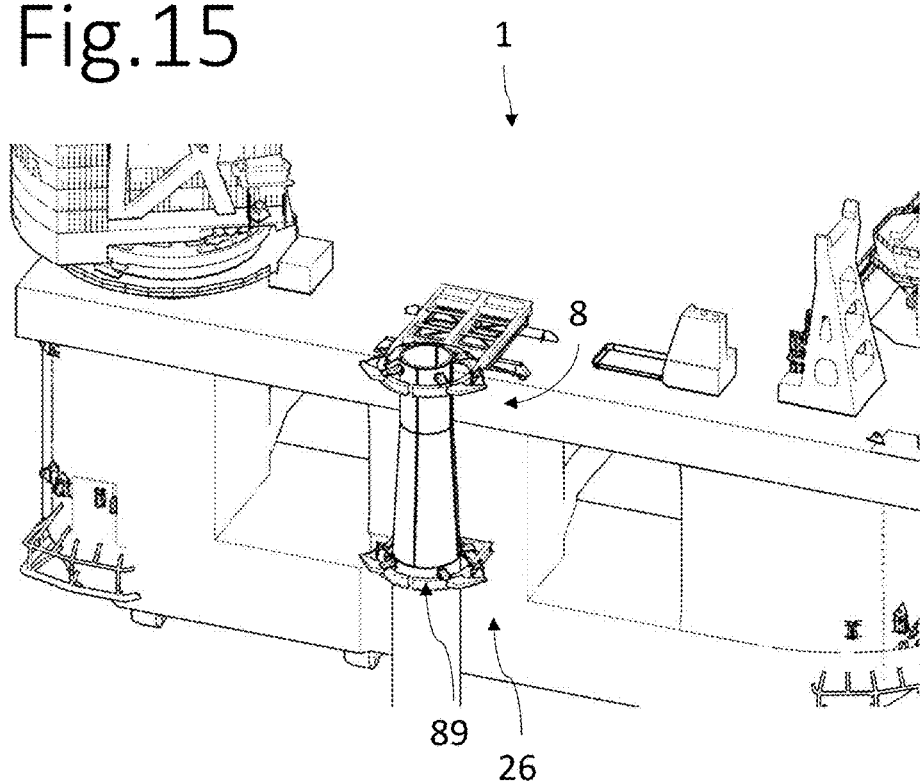
Figure 16:
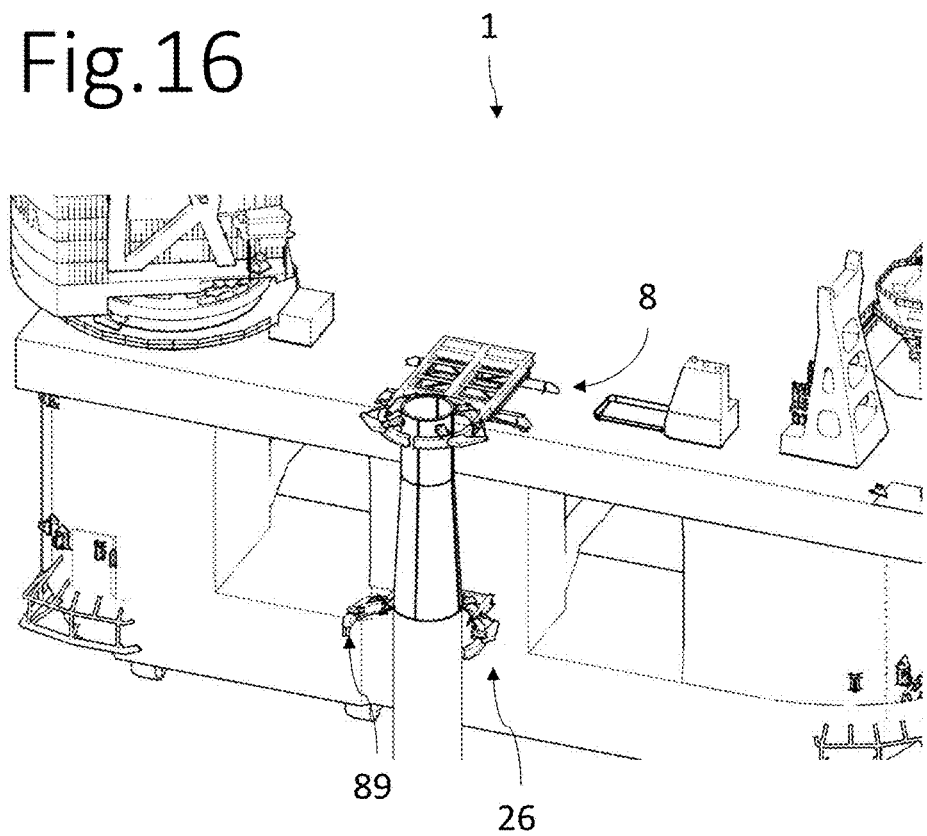
Figure 17B:
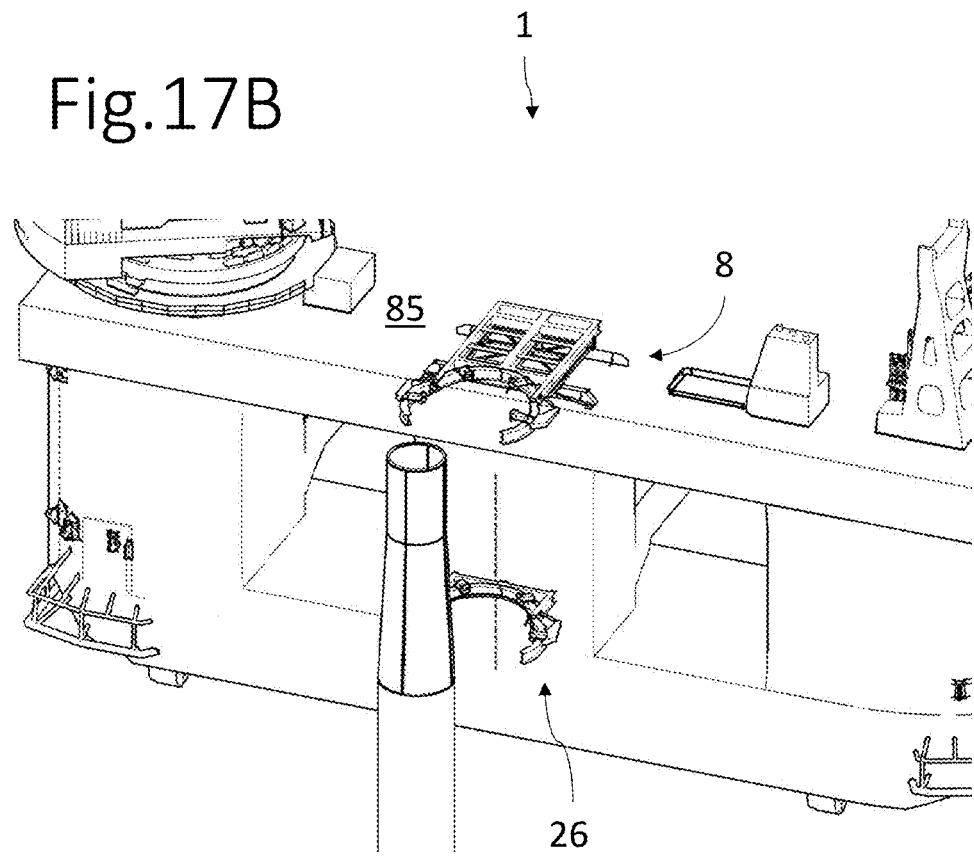

When the pile 2 has reached its target depth, the pile 2 driving tool is removed from the top of the pile 2. FIGS. 15 to 17 show the next steps of removing the pile driving tool and moving the opening members 51 to the open position 52 and moving the vessel 4 away from the installed pile 2 (FIG. 17B).

The natural period 205 of the pivoting moment 30 of the pile 2 during installation is kept longer than the dominant wave period 203 at the installation location 6 by the pile guiding system 8.

During installation of the pile 2 the natural period 205 of the pivoting movement 15 of the pile 2 during installation is kept longer than the dominant wave period 203 at the installation location 6 by adjusting the connection stiffness 13 of the resilient member 11. This is shown in FIGS. 9 to 12, wherein the pile 2 pivots relative to the vessel 4.

The second guiding device 26 in the FIGS. 9 to 12 is rigidly connected to the vessel 4. Hence, the second guiding device 26 remains stationary. The second guiding device 26 comprises resilient members 11 for keeping the natural period 205 of the pivoting movement 15 of the pile 2 longer than the dominant wave period 203. For the method it is also possible that the second guiding device 26 is movable relative to the vessel 4 and/or relative to the first guiding device 10.

Figure 9B:
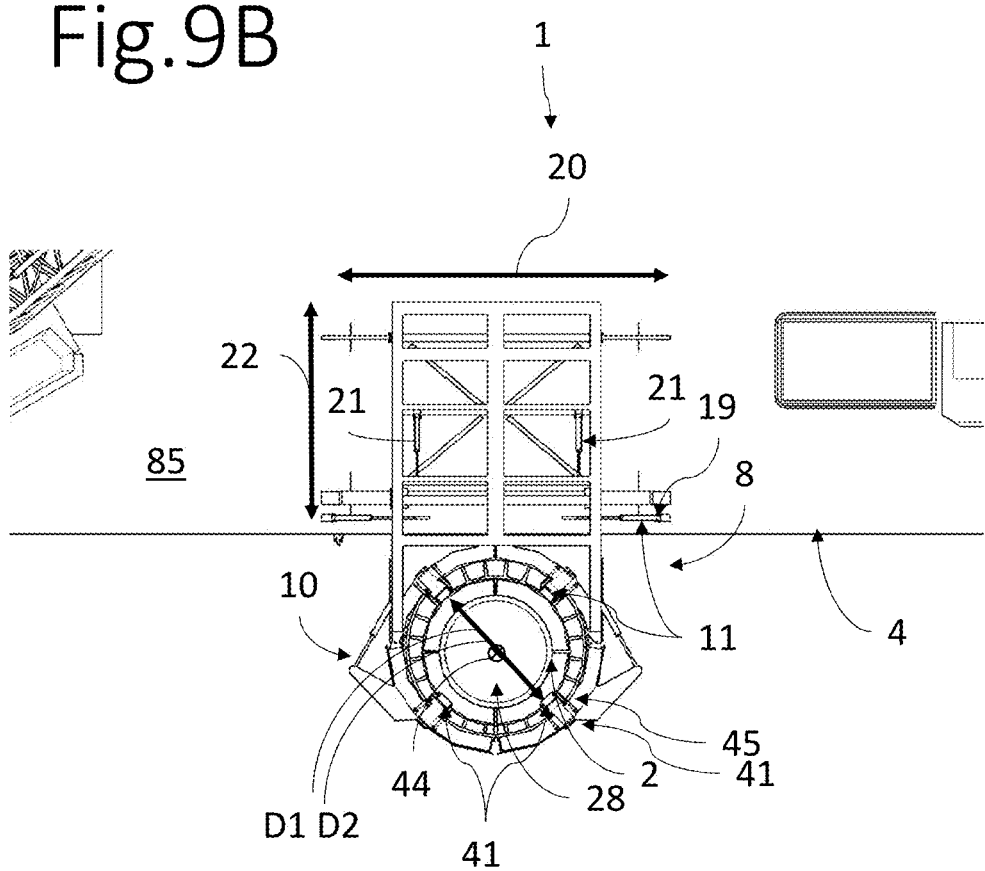
Figure 9C:
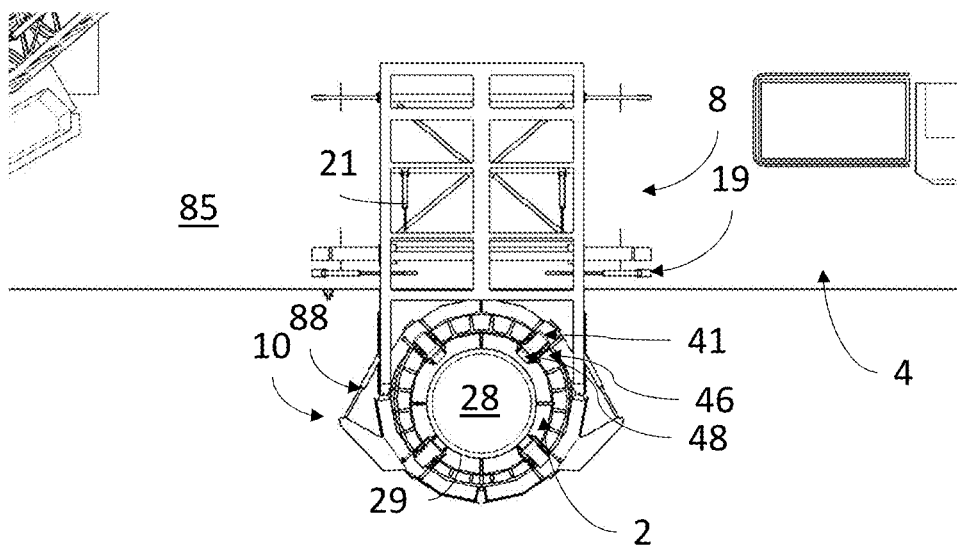

In FIG. 9 the pile 2 is in a substantially vertical position. This is the desired and predetermined, first orientation 33 in which orientation the pile 2 is to be installed. The engaging members 41 are moved from a non-engaging position (FIG. 9B) to an engaging position (FIG. 9C) wherein the engaging member 41 engage the pile 2.

FIG. 10 shows the pile 2 in a pivoted position, i.e. non-aligned position 32. The first guiding device 10 has moved in the first direction 20.1 relative to the base 9. FIG. 10B shows the two resilient members 11 in the form of first actuators 19 between the base 9 and the first guiding device 10 being moved inwardly and outwardly by the pressure of the pile 2, respectively. The resilient members 11 provided in the engaging member 41 are moved inward. The diametrically opposing engaging members 41 may be idle at this point. They do not have to contact the pile 2 as shown in FIG. 10B.

Figure 11A:
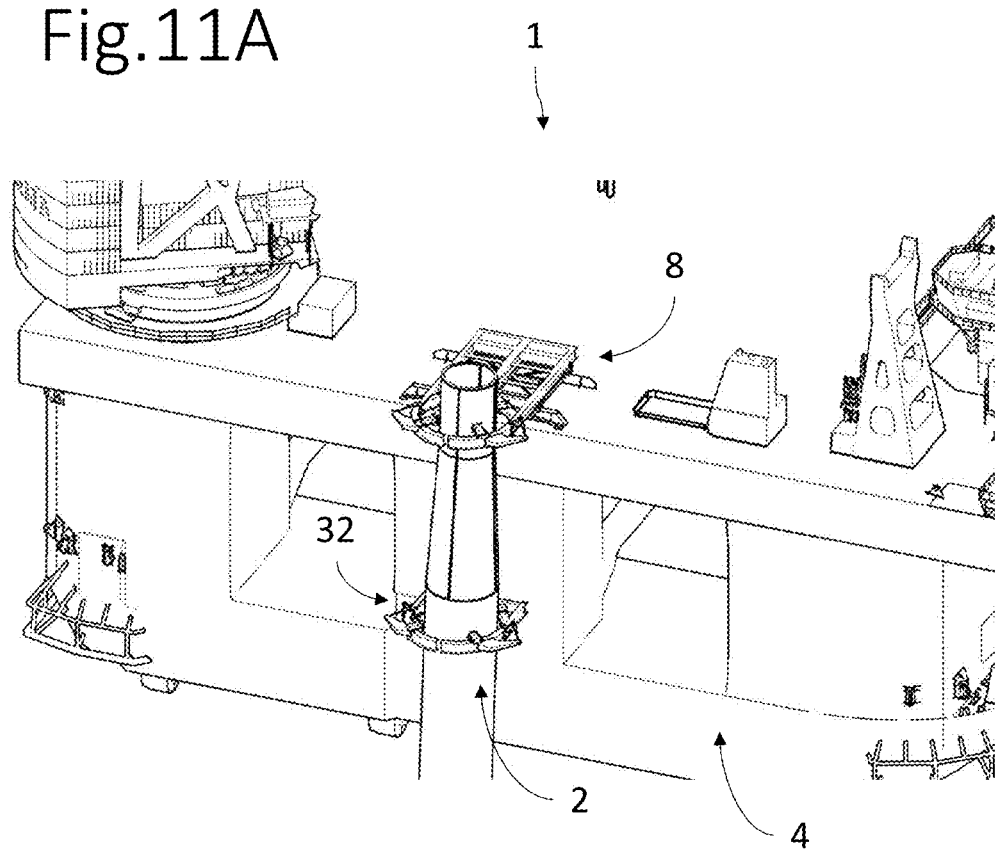
Figure 11B:
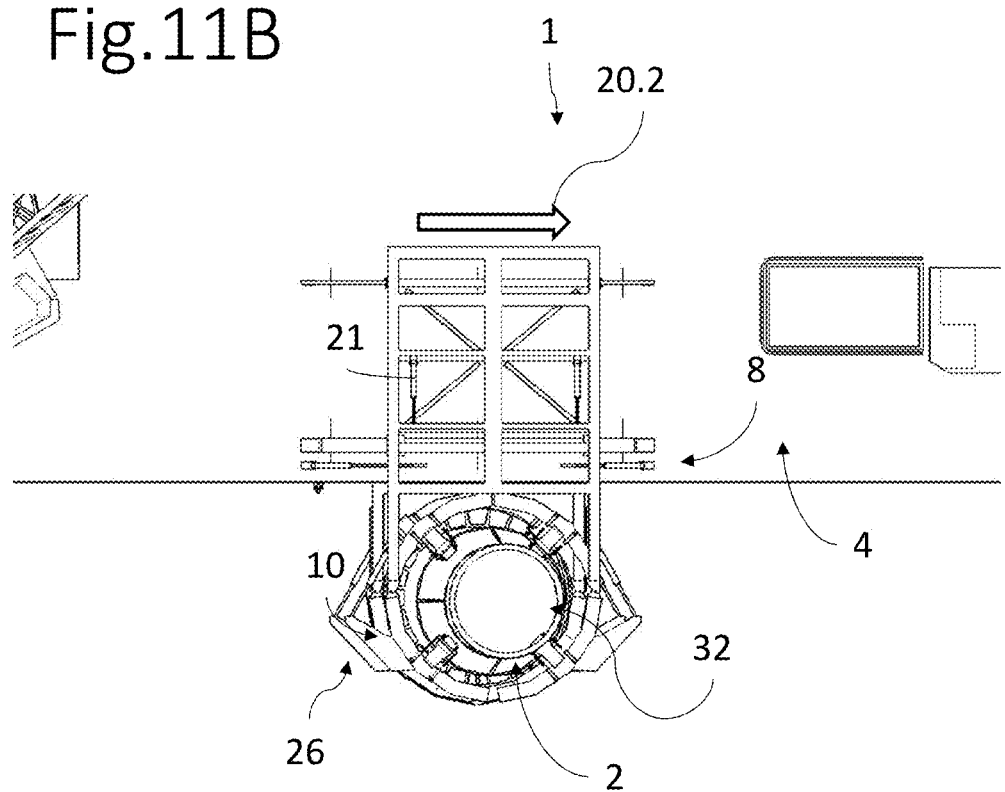

FIG. 11 shows a pivoting movement 15 of the pile 2 in a direction 20.2 opposite to the direction 20.1 in FIG. 10B.

Figure 12A:
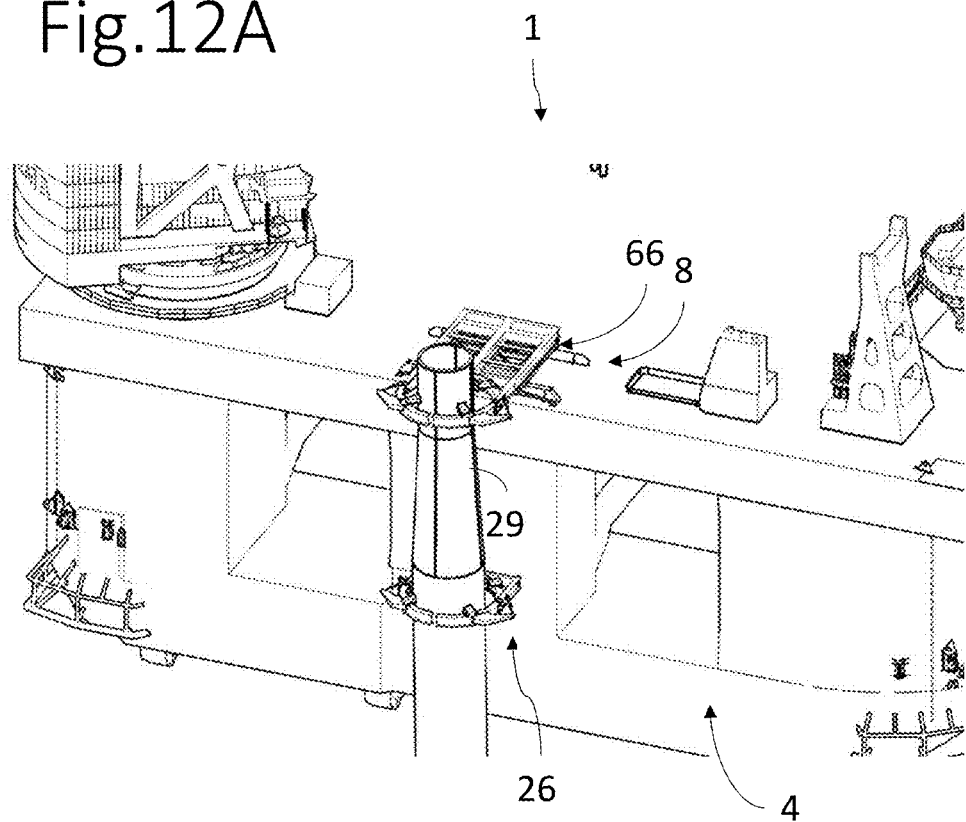
Figure 12B:
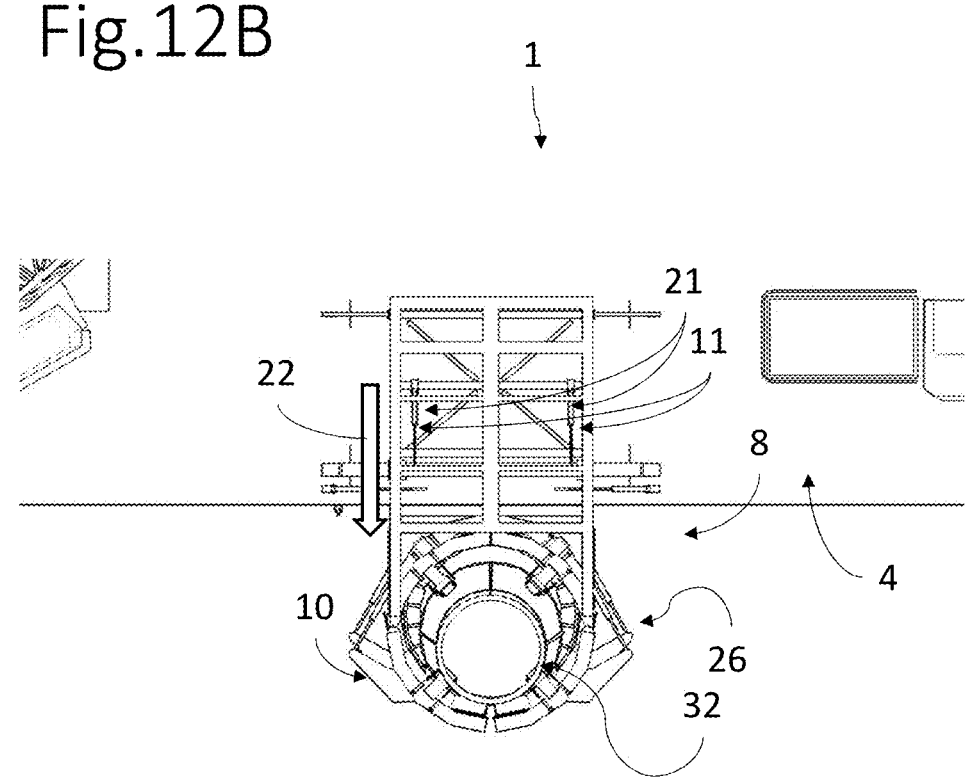

FIG. 12 shows the pile 2 being pivoted away from the vessel 4. The second actuators 21, and/or resilient members 11, between the intermediate frame 66 and the first guiding device 10 allow the first guiding device 10 to move outwardly together with the pile 2.

The resilient member 11 allows relative motions between the pile 2 and the pile guiding system 8, as shown in FIGS. 9-12. This leads to lower loads on the vessel 4 compared to a pile guiding system 8 according to the prior art in which the pile 2 is more rigidly held.

The pile guiding systems 8 as described in relation to FIGS. 22-25 and FIGS. 26-29 are also suitable to perform the above described method. A positioning system can be a dynamic positioning system, a spread mooring system 25, or a jack-up system 95.

A second application relates to a method of installing a pile 2 into a seabed 3 with a floating vessel 23, wherein a moment 30 is applied to the pile 2 for reorienting a pile 2 from a non-aligned orientation 32 to a predetermined orientation.

The method comprises the steps:
a) providing the floating vessel 23 and a pile guiding system 8 connected to said floating vessel 23 via a base frame 9 at an installation location, wherein the pile guiding system 8 comprises a guiding opening 28 for accommodating the pile 2 during pile installation,
b) positioning the pile 2 in the guiding opening 28 of the pile guiding system 8, see FIGS. 3 and 4,
c) lowering the pile 2 to the sea bed, see FIG. 5, d) fixing a bottom end of the pile 2 to the seabed 3 in a horizontal direction (not shown), e) moving the pile 2 downwards into the seabed 3 in a predetermined, first orientation 33, in particular a vertical orientation, by exerting a downward force on the pile 2, see FIGS. 13 and 14, When during at least step e) or after step d) the pile 2 becomes non-aligned with the predetermined first orientation 33, the pile 2 is reoriented from a second non-aligned orientation 32 back to the predetermined first orientation 33 by applying a moment 30 about a horizontal axis 31 on the pile 2 with the pile guiding system 8.

For the installation of wind turbines the first orientation 33 will generally be a vertical orientation, or a substantially vertical orientation.

Step b) can be performed by an on board crane 82 provided on the floating vessel 23.

Step b) can also be performed by an upending device (not shown) for upending the pile 2 from a substantially horizontal orientation on deck 85 to the upright orientation 74.

Step e) can be performed by a hammering tool 87, for example a vibrating hammering tool 87. Other known tools are also possible.

During step d) the bottom end of the pile 2 can be fixed in the horizontal direction by allowing the bottom end of the pile 2 to penetrate the sea bed by using self-weight of the pile 2. The pile 2 will penetrate itself into the seabed 3, thereby fixing the bottom of the pile 2 in a horizontal plane. It is also possible to fix the bottom end of the pile 2 by positioning the bottom end of the pile 2 in a retaining device (not shown). The retaining device is located on the seabed 3 at the installation location 6 and configured to prevent horizontal movements of the bottom end of the pile 2. A known retaining device is for example a mudmat.

In order to apply the moment 30 the first guiding device 10 and the second guiding device 26 engage an outer surface 29 of the pile 2 for holding the pile 2. The moment 30 is then applied to the pile 2 by exerting a first force 34 to the pile 2 via the first guiding device 10 in a direction 35 towards the first orientation 33, and exerting a second force 36 opposite to the first force 34 to the pile 2 via the second guiding device 26. The first force 34 and the second force 36 together constitute the moment 30.

The first force 34 is exerted on the pile 2 by moving the first guiding device 10 relative to the base frame 9 by the first actuator 19 and/or second actuator 21 in the direction of the predetermined, first orientation 33.

The first force 34 and the second force 36 act substantially horizontally on the pile 2.

The first force 34 which the first guiding device 10 exerts on the pile 2 can be a predetermined force. The magnitude of said predetermined force is based on the deviation of the pile 2 from the predetermined first orientation 33. When the deviation of the pile 2 becomes larger, the predetermined force becomes greater, and vice versa.

In order to measure the orientation, and thereby the deviation of the pile 2 from the predetermined first orientation 33 a control unit (not shown) is provided which is coupled to the pile guiding system 8. The control unit comprises a sensor (not shown) for measuring the orientation of the pile 2 during installation. When during step e) or after step d) the sensor measures a non-alignment of the pile 2 with the predetermined first orientation 33 the control unit actuates the pile guiding system 8 to apply the moment 30 to the pile 2.

The control unit may comprise a sensor (not shown) for measuring the rate of change of the non-alignment. The control unit then further comprises a PID controller (not shown) which actuates the pile guiding system 8 to apply the moment 30 to the pile 2 based on the first orientation 33 as set point.

During at least step e) or after step d), or after step d) the first actuator 19 and/or the second actuator 21 may be configured to keep the first guiding device 10 substantially stationary relative to the installation location 6 in a plane defined by the first direction 20 and the second direction 22 while moving the first guiding device 10 relative to the floating vessel 23. This helps in keeping the vessel 4 in position, i.e. at the installation location.

The floating vessel 23 comprises a positioning system configured to keep the floating vessel 23 within a predetermined area. The first guiding device 10 is movable relative to the floating vessel 23 over the predetermined area via the first actuator 19 and/or the second actuator 21.

The positioning system can be a dynamic positioning system, or a spread mooring system 25.

In the embodiment where the second guiding device 26 is rigidly connected to the floating vessel 23 during the reorientation the first guiding device 10 applies the first force 34 to the pile 2 and the second guiding device 26 exerts the second force 36 on the pile 2. The second guiding device 26 in this case passively exerts the second force 36 on the pile 2, because the first guiding device 10 pushes the pile 2 against the second guiding device 26. In a sense the pile 2 exerts the second force 36 on the second guiding device 26. Because action is reaction, the second guiding device 26 exerts the second force 36 on the pile 2 in the direction opposite to the first force 34 exerted by the first guiding device 10.

In the embodiment where the second guiding device 26 is movable relative to the first guiding device 10 via a third actuator 63 and/or a fourth actuator in the first direction 20 and/or second direction 22, respectively, during the reorientation the second guiding device 26 moves in the opposite direction of the first guiding device 10. Compared to the embodiment where the second guiding device 26 is rigidly connected to the floating vessel 23, this embodiment allows the second guiding device 26 to actively exert the second force 36 on the pile 2.

Prior to step b) the opening member 51 is in the open position 52, and wherein after step d) the opening member 51 is in the closed position 53.

Prior to step b) the engaging members 41 may be in a first, outward position 45, i.e. a non-engaging position (FIG. 9A). When the pile 2 is positioned in the guiding opening 28 the engaging members 41 are then moved radially inward to their second, engaging position 46 (FIG. 9B) by respective engaging actuators 43 for engaging the outer surface 29 of the pile 2. The engaging members 41 are preferably moved to their engaging position once the opening member 51 is in its closed position 53 enclosing the pile 2.

During step e) the engaging members 41 are placed at regular intervals around the circumference 42 of the pile 2.

When step e) has finished, the engaging member 41 are moved back to their first position.

When the pile 2 has reached its target depth, i.e. when step e) has finished, the opening member 51 is moved to the open position 52. This way, the vessel 4 is able to move away from the pile 2.

Each engaging member 41 may comprise a resilient member 11 for providing the resilient pile 2 connection between the pile 2 and the respective guiding device.

When during step e) the pile 2 is driven deeper and deeper into the seabed 3 this will generally have an effect on the stiffness of the pile 2, i.e. the pile 2 will act stiffer. This has an effect on the pile motions and the natural period 205 thereof. In order to allow the natural period 205 of the pile motions to remain longer than the dominant wave period 203 the resilient member 11 is adjustable via an adjusting member 49. The adjusting member 49 can decrease the stiffness to a lower stiffness during the downward 50 moving of the pile 2 into the seabed 3 when the stiffness of the soil, and thus the pile 2 increases. This can be done based on predetermined soil calculations, wherein for each penetration depth a connection stiffness is predetermined.

The method can also be performed by an embodiment as described in relation to FIGS. 26 to 29, wherein the first guiding device 10 and the second guiding device 26 are connected to each other via a main frame 65. The main frame 65 is connected to the base frame 9 and freely movable relative to said base frame 9 in a first direction 20 and/or a transverse, second direction 22.

The main frame 65 is rotatable relative to the intermediate frame 66 about a first axis 69 by the first intermediate actuator 67 and/or a transverse, second axis 70 by the second intermediate actuator. During step e) or after step d) the first intermediate actuator 67 and/or the second intermediate actuator keep the main frame 65 substantially stationary relative to the pile 2 while moving the main frame 65 relative to the floating vessel 23.

The pile guiding system 8 with the main frame 65 applies the moment 30 to the pile 2 by rotating the main frame 65 about the first axis 69 with the first intermediate actuator 67 and/or the second axis 70 with the second intermediate actuator 68, see also FIG. 33.

In another application a method is provided for assisting to keep a floating vessel 23 at an installation location 6 during installation of a pile 2 into a seabed 3 at the installation location. The method comprises the steps:
 a) providing the floating vessel 23 and a pile guiding system 8 comprising a first guiding device 10 and a second guiding device 26 connected to said floating vessel 23 at the installation location,
 b) positioning the pile 2 in the guiding opening 28 of the pile guiding system 8, see FIGS. 3 and 4,
 c) lowering the pile 2 to the sea bed, see FIG. 4 to FIG. 5,
 d) fixing a bottom end of the pile 2 to the seabed 3 in a horizontal direction,
 e) keeping the first guiding device 10 substantially stationary relative to the installation location,
wherein when the vessel 4 moves away from the installation location 6 the second guiding device 26 assists in moving the floating vessel 23 back to the installation location 6 by a force induced by the pile 2 on the second guiding device 26 in a direction 35 towards the installation location.

An advantage of this method is that when the floating vessel 23 comprises a dynamic positioning system for keeping the vessel 4 within a predetermined area, a control unit that may be provided for controlling the first guiding device 10 does not have to be coupled with the dynamic positioning system of the floating vessel 23.

The method for moving the non-aligned pile 2 back to the predetermined, first orientation 33 is schematically shown in FIG. 32 for a pile guiding system 8 as shown in FIGS. 3 to 25. Said method is schematically shown in FIG. 33 for a pile guiding system 8 comprising a main frame as shown in FIGS. 26-29.

FIG. 32A shows the pile 2 in the predetermined, first orientation 33. The vessel 4 is positioned at the installation location 6. The pile 2 is horizontally fixed in the soil, i.e. the seabed 3. The first guiding device 10 and the second guiding device 26 are in a begin position, i.e. at the installation location.

FIG. 32B shows the pile 2 in a tilted position, i.e. the non-aligned position 32. The first guiding device 10 and the second guiding device 26 are still in the begin position. The pile 2 engages the first guiding device 10 which results in a pushing away of the vessel 4.

FIG. 32C shows the pile 2 in the non-aligned position 32 and the vessel 4 in a position away from the installation location. The vessel 4 has been moved due to the force of the pile 2 on the first guiding device 10 as shown in FIG. 32B.

In order to move the pile 2 back to the predetermined, first orientation 33 the first guiding device 10 is moved towards the installation location. The right side of the first guiding device 10 thereby exerts the first force 34 on the right side of the pile 2. The movement of the first guiding device 10 relative to the second guiding device 26 results in the exertion of the second force 36 on the pile 2. The second force 36 is exerted on the left side of the pile 2 with a left side of the second guiding device 26. First force 34 and the second force 36 together constitute the moment 30 applied on the pile 2. The pile 2 will be moved back to the predetermined, first orientation 33. In addition, the floating vessel 23 will also be moved back towards the installation location.

FIG. 33 schematically shows the pile 2 and the vessel 4 in the same position as shown in FIG. 32C. The moment 30 is however applied via vertical forces via resilient members and/or third and fourth actuators 67,68 instead of via horizontal forces, i.e. vertical forces are exerted on the vessel 4, while the forces exerted on the pile 2 are horizontal forces.

FIG. 34 schematically shows an example of an assembly 1 comprising a floating vessel 23 and a pile guiding system 8 having only a first guiding device 10 and not a second guiding device 26. When the pile 2 tilts, the vessel 4 is pushed away from the installation location. In order to move the pile 2 back to the predetermined, first orientation 33, the vessel 4 has to provide all the force via its thrusters 96.

FIG. 35 schematically shows the pile guiding system 8 and the method for assisting in keeping the vessel 4 at the installation location. In FIG. 35 the vessel 4 is shown in a position away from the installation location. The bottom end of the pile 2 is horizontally fixed in the seabed 3. In order to move the vessel 4 back to the installation location, the first guiding device 10 is kept stationary relative to the installation location. When the vessel 4 moves the second guiding device 26 moves with it. When the vessel 4, and thus the second guiding device 26 move beyond a predetermined position this will result in the second force 36 on the second guiding device 26 which is exerted by the pile 2. The second force 36 is exerted on a left side of the second guiding device 26 with a left side of the pile 2. The first guiding device 10 exerts the first force 34. This will keep the vessel 4 at the installation location, or at least prevents the vessel 4 to move beyond a predetermined position. The invention reduces the amount of power required by the thrusters to keep the vessel 4 at the installation location.

When the pile 2 has reached a penetration depth at which it is stable, the pile guiding system 8 is also suited to act as a pile holding device, or pile anchoring device. The pile guiding system 8 may be kept connected to the stable pile while other actions are performed on the pile, for example the placement of a wind turbine. The connected pile guiding system 8, or then pile holding or pile anchoring system, may aid or even replace the positioning system of the vessel 4 for keeping the vessel in position. The pile therefore takes up at least a part of the loads. The use of the resilient member is beneficial as it reduces the loads on the system and the resilient member may be actively tuned for the vessel its surge and sway periods to be longer than the predominant wave periods. This works for the pile guiding system 8 with the first guiding device 10 and second guiding device 26, but also for the pile guiding system 8 with only the first guiding device 10. So instead of the resilient member 11 being configured to keep the natural period 205 of the pivoting movement of the pile about the seabed caused by the waves during installation thereof longer than the dominant wave period 203 of the wave spectrum 200 at the installation location, the resilient member 11 for the pile anchoring system is configured to keep the surge and sway periods of the vessel longer than the predominant wave period by providing the resilient connection with a low connection stiffness 13.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. An assembly for installing a pile in a seabed, the assembly comprising:
   a vessel comprising:
      a positioning system for keeping the vessel at an installation location relative to the seabed, the positioning system having a positioning stiffness,
   a pile guiding system configured to guide the pile during installation thereof, the pile guiding system comprising:
      a base provided on the vessel,
      a first guiding device connected to the base, the first guiding device being configured to accommodate the pile during installation thereof,
      a resilient member for providing a resilient connection between the vessel and the pile during installation thereof for allowing relative motions between the pile and the vessel, the resilient member having a connection stiffness,
      wherein the resilient member is configured and intended to keep a natural period of a pivoting movement of the pile about the seabed caused by waves during installation of the pile longer than a dominant wave period of a wave spectrum at the installation location by providing the resilient connection with a low connection stiffness, wherein the connection stiffness is low enough to keep the natural period of the pivoting movement of the pile longer than the dominant wave period, and high enough to provide stability to the pile.

2. The assembly according to claim 1, wherein the resilient member is configured and intended to keep said natural period longer than 1.5 times the dominant wave period of the wave spectrum at the installation location.

3. The assembly according to claim 1, wherein the pile guiding system comprises a first actuator for moving the first guiding device relative to the base in a first direction.

4. The assembly according to claim 3, wherein the pile guiding system comprises a second actuator for moving the first guiding device relative to the base in a second direction, the second direction being transverse to the first direction.

5. The assembly according to claim 4, wherein a second guiding device is movable relative to the first guiding device in the first direction via a third actuator and/or in the second direction via a fourth actuator.

6. The assembly according to claim 1, wherein the vessel is a floating vessel configured to float during installation of the pile.

7. The assembly according to claim 6, wherein the positioning system is a dynamic positioning system or a mooring system or a combination of both.

8. The assembly according to claim 1, wherein the pile guiding system comprises a second guiding device located at a distance above or below the first guiding device, wherein the first and second guiding devices define a guiding opening for accommodating the pile, wherein the first guiding device and the second guiding device are configured to engage an outer surface of the pile for holding the pile.

9. The assembly according to claim 8, wherein the first guiding device and second guiding device are configured to together apply a moment about a horizontal axis to the pile for reorienting the pile from a non-aligned orientation to a predetermined, first orientation, the moment being applied by exerting a first force to the pile in a direction towards the predetermined, first orientation by the first guiding device, and by exerting a second force opposite to the first force to the pile via the second guiding device.

10. The assembly according to claim 9, wherein the pile guiding system comprises a main frame, wherein the first guiding device and second guiding device are connected to each other via the main frame, and wherein the first guiding device and second guiding device are connected to a base frame via the main frame, wherein the main frame is freely movable relative to the base frame in the first direction and/or the second direction.

11. The assembly according to claim 1, wherein the first guiding device and/or a second guiding device comprises a plurality of engaging members for engaging the pile during installation.

12. The assembly according to claim 11, wherein the engaging members are connected to their corresponding guiding device via an engaging actuator for moving the engaging members inwardly and outwardly relative to a centre of a guiding opening between a first, outward position, wherein the engaging members do not engage the pile, and a second, inward position, wherein the engaging members engage the pile.

13. The assembly according to claim 11, wherein the engaging members comprise the resilient member for providing a resilient pile connection between the pile and the respective guiding device.

14. The assembly according to claim 1, wherein the connection stiffness of the resilient member is adjustable via an adjusting member, wherein the adjusting member is configured to decrease the connection stiffness to a lower stiffness during a downward moving of the pile into the seabed as a soil stiffness increases.

15. A pile guiding system configured to be connected to a floating vessel, the pile guiding system being configured to hold a pile during pile installation, wherein the pile guiding system comprises:
a base via which the pile guiding system is configured to be connected to the vessel, a first guiding device connected to the base, the first guiding device being configured to accommodate the pile during installation of the pile,
a resilient member for providing a resilient connection between the vessel and the pile during installation thereof for allowing relative motions between the pile and the vessel, the resilient member having a connection stiffness,
wherein the resilient member is configured and intended to keep a natural period of a pivoting movement of the pile about a seabed caused by waves during installation of the pile longer than a dominant wave period of a wave spectrum at an installation location by providing the resilient connection with a low connection stiffness, wherein the connection stiffness is low enough to keep the natural period of the pivoting movement of the pile longer than the dominant wave period, and high enough to provide stability to the pile.

16. The pile guiding system according to claim 15, wherein the pile guiding system comprises a second guiding device located at a distance above or below the first guiding device, wherein the first and second guiding devices define a guiding opening for accommodating the pile, wherein the first guiding device and the second guiding device are configured to engage an outer surface of the pile for holding the pile, wherein the first guiding device and second guiding device are configured to together apply a moment about a horizontal axis to the pile for reorienting the pile from a non-aligned orientation to a predetermined, first orientation, the moment being applied by exerting a first force to the pile in a direction towards the predetermined, first orientation by the first guiding device, and by exerting a second force opposite to the first force to the pile via the second guiding device.

17. A method for installing a pile with a vessel, the method comprising the steps:
a) providing an assembly for installing a pile in a seabed at an installation location, the assembly comprising:
a vessel comprising:
a positioning system for keeping the vessel at an installation location relative to the seabed, the positioning system having a positioning stiffness,
a pile guiding system configured to guide the pile during installation thereof, the pile guiding system comprising:
a base provided on the vessel,
a first guiding device connected to the base, the first guiding device being configured to accommodate the pile during installation thereof,
a resilient member for providing a resilient connection between the vessel and the pile during installation thereof for allowing relative motions between the pile and the vessel, the resilient member having a connection stiffness,
wherein the resilient member is configured and intended to keep a natural period of a pivoting movement of the pile about the seabed caused by waves during installation of the pile longer than a dominant wave period of a wave spectrum at the installation location by providing the resilient connection with a low connection stiffness, wherein the connection stiffness is low enough to keep the natural period of the pivoting movement of the pile longer than the dominant wave period, and high enough to provide stability to the pile,
b) positioning the pile in an upright orientation in the pile guiding system,
c) lowering the pile to the sea bed,
d) installing the pile into the seabed,
wherein the natural period of the pivoting moment of the pile during a phase of installation in which the pile has not reached a self-stabilizing penetration depth is kept longer than the dominant wave period at the installation location by the pile guiding system by providing the resilient connection with the low connection stiffness, wherein the connection stiffness is low enough to keep the natural period of the pivoting movement of the pile longer than the dominant wave period, and high enough to provide stability to the pile.

18. The method according to claim 17, wherein the natural period of the pivoting movement of the pile during installation is kept longer than the dominant wave period at the installation location by adjusting the connection stiffness of the resilient member.

19. The method according to claim 17, wherein the natural period of the pivoting moment of the pile is brought from a natural period higher than the dominant wave period to a natural period lower than the dominant wave period after the pile has reached a predetermined penetration depth.

* * * * *